US009274514B2

(12) United States Patent
Igarashi et al.

(10) Patent No.: US 9,274,514 B2
(45) Date of Patent: Mar. 1, 2016

(54) MOTOR CONTROL APPARATUS

(75) Inventors: Yuji Igarashi, Tokyo (JP); Hidetoshi Ikeda, Tokyo (JP); Takashi Iwasaki, Tokyo (JP); Takeshi Hatanaka, Tokyo (JP); Masayuki Fujita, Tokyo (JP)

(73) Assignees: Mitsubishi Electric Corporation, Tokyo (JP); Tokyo Institute of Technology, Tokyo (JP)

( * ) Notice: Subject to any disclaimer, the term of this patent is extended or adjusted under 35 U.S.C. 154(b) by 0 days.

(21) Appl. No.: 14/356,229

(22) PCT Filed: Mar. 21, 2012

(86) PCT No.: PCT/JP2012/057217
§ 371 (c)(1),
(2), (4) Date: May 5, 2014

(87) PCT Pub. No.: WO2013/077007
PCT Pub. Date: May 30, 2013

(65) Prior Publication Data
US 2014/0306641 A1 Oct. 16, 2014

(30) Foreign Application Priority Data

Nov. 22, 2011 (JP) .................................. 2011-254929

(51) Int. Cl.
*G06G 7/54* (2006.01)
*G05B 17/02* (2006.01)
(Continued)

(52) U.S. Cl.
CPC ............ *G05B 17/02* (2013.01); *H02P 23/0004* (2013.01); *H02P 23/12* (2013.01)

(58) Field of Classification Search
CPC ...... G05B 13/042; G05B 13/00; G05B 13/02; G05B 13/04; G05B 13/048; G05B 19/404; G05B 2219/41163; G05B 2219/42155; G05B 2219/42157; G05B 2219/42162; G05B 5/01; G05B 13/027; G05B 13/047; G05B 23/0254; G05B 17/02; G05B 13/024; G05B 11/42; G05B 13/0245; G05B 13/026; G05B 13/041; G11B 5/59622; G11B 21/10; H02P 23/0004; H02P 23/12

USPC ............ 703/13–22, 2; 318/560, 501; 700/28, 700/30, 32, 47, 48; 316/560; 360/77
See application file for complete search history.

(56) References Cited

U.S. PATENT DOCUMENTS 5,675,450 A * 10/1997 Kadlec ........................ 360/78.09
5,754,358 A * 5/1998 Yatsu ......................... 360/78.09
(Continued)

FOREIGN PATENT DOCUMENTS

| JP | 2005 285030 | 10/2005 |
| JP | 2010 130852 | 6/2010 |
| WO | 2011 136160 | 11/2011 |

OTHER PUBLICATIONS

Peterson, Math Forum—Ask Dr. Math: What is a Vector?, Jan. 4, 2002 http://mathforum.org/library/drmath/view/55466.html.*
(Continued)

*Primary Examiner* — Carlos Ortiz Rodriguez
*Assistant Examiner* — Scott S Cook
(74) *Attorney, Agent, or Firm* — Oblon, McClelland, Maier & Neustadt, L.L.P.

(57) ABSTRACT

A motor control apparatus includes a reference model unit configured to generate a model output, a feedback unit configured to generate a feedback, and an adder configured to add up the model input and the feedback and generate a control input to the controlled object. The reference model unit includes a storing unit configured to retain, as a vector, a present value of the target value and one or a plurality of past values of the target value, a numerical model configured to simulate a characteristic of the controlled object and generate the model output and a state variable on the basis of the model input, a model controller configured to generate the model input and a controller determining unit configured to determine the model controller.

10 Claims, 7 Drawing Sheets

(51) Int. Cl.
  *H02P 23/12* (2006.01)
  *H02P 23/00* (2006.01)

(56) References Cited

U.S. PATENT DOCUMENTS

| | | | |
|---|---|---|---|
| 5,936,792 A * | 8/1999 | Kobayashi et al. | 360/78.07 |
| RE40,545 E * | 10/2008 | Ioannou et al. | 360/77.06 |
| 2003/0229407 A1* | 12/2003 | Yasui et al. | 700/29 |
| 2006/0072391 A1* | 4/2006 | Zhou | 369/44.32 |
| 2010/0100248 A1* | 4/2010 | Minto et al. | 700/287 |
| 2010/0142082 A1* | 6/2010 | Sakagami | G11B 5/5582 360/75 |
| 2011/0069411 A1* | 3/2011 | Uchida | G11B 19/042 360/77.04 |
| 2013/0035914 A1 | 2/2013 | Igarashi et al. | |

OTHER PUBLICATIONS

Include: Defined, The RandomHouse College Dictionary Revised Edition, 1982 ISBN-0-394-43600-8.*
International Search Report Issued Jun. 19, 2012 in PCT/JP12/057217 Filed Mar. 21, 2012.

* cited by examiner $O_{\infty 1}$: MAXIMUM OUTPUT ADMISSIBLE SET CREATED USING GAINS {K1, Kr1, Kvr1, Kar1}
$O_{\infty 2}$: MAXIMUM OUTPUT ADMISSIBLE SET CREATED USING GAINS {K2, Kr2, Kvr2, Kar2}
$O_{\infty 3}$: MAXIMUM OUTPUT ADMISSIBLE SET CREATED USING GAINS {K3, Kr3, Kvr3, Kar3}

MOTOR CONTROL APPARATUS

FIELD

The present invention relates to a motor control apparatus that drives an industrial machine.

BACKGROUND

It is desired that a motor control apparatus causes a motor position and speed to follow target values such as a position target value and a speed target value at high speed and high accuracy. To realize this, two degrees of freedom control obtained by combining feed forward control and feedback control is used. As a method of further increasing speed and accuracy, a control method for pre-reading and using not only a present target value but also a future target value is sometimes used. Further, simultaneously with the increases in the speed and the accuracy, it is also necessary to suppress residual vibration during a stop that occurs because of mechanical resonance and the like. Vibration suppression is realized by damping control for designing a feed forward control system to reduce a signal component at a vibration frequency (a resonance frequency) of an industrial machine.

Usually, to cause a motor to follow a target value at higher speed and higher accuracy, it is necessary to generate larger torque. When control for actively suppressing residual vibration during a stop is performed, larger torque is necessary and a change amount of the torque increases. However, there is a limit for a control input of torque that the motor can generate, and also for an electric current applied to the motor necessary for generating the torque, or the like. The change amount of the torque is closely related to a voltage generated in a motor control apparatus. When the change amount of the torque increases, the voltage increases and voltage saturation occurs. When the change amount of the torque increases, a shock given to a machine system also increases. Accordingly, there is also a limit in a change amount of the control input such as the change amount of the torque. Therefore, there is a desire for control that can follow a target value at high speed and high accuracy and suppress residual vibration during a stop while satisfying constraints on a control input and a change amount.

For example, Patent Literature 1 discloses an electric motor control apparatus that performs, using target values two steps ahead or four steps ahead, prediction control in which target values M (M>4) steps ahead are necessary. In the related art, a control operation is simplified by using only the target values two steps or four steps ahead. An overshoot during acceleration and deceleration is reduced and followability during fixed speed is improved by calculating speed feed forward and torque feed forward from these values and using the speed feed forward and the torque feed forward for control.

A servo control apparatus described in Patent Literature 2 includes a changeover switch and, when the changeover switch is ON, uses feedback control or two degrees of freedom control in which a prediction controller is used as a feedback controller and, when the changeover switch is OFF, switches the feedback control of only position proportional control to improve performance. In the related art, when a controlled object requests highly accurate followability, the servo control apparatus turns on the changeover switch. When a target command increase value changes, the servo control apparatus turns off the changeover switch. To make control inputs before and after the switching continuous, the servo control apparatus linearly interpolates the control inputs before and after the switching using a filter function unit.

CITATION LIST

Patent Literature

Patent Literature 1: Japanese Patent Application Laid-Open No. 2010-130852
Patent Literature 2: Japanese Patent Application Laid-Open No. 2005-285030

SUMMARY

Technical Problem

Incidentally, the related art described in Patent Literature 1 discloses a technology for, by using future target values two steps ahead or four steps ahead, further simplifying the control operation than the conventional prediction control and realizing higher speed and higher accuracy than the related art in which future target values are not used. However, when a feed forward gain and a constant to be calculated in advance are fixed, there is a problem in that it is difficult to realize, for changes of various commands, high-speed and high-accuracy control as much as possible within constraints on the size of a control input and a change amount of the control input.

The related art described in Patent Literature 2 discloses a technology for switching a controller to realize high-speed and high-accuracy control. However, there is a problem in that, simply by turning on the changeover switch when the controlled object requests high accuracy, and turning off the changeover switch when a target command increase value changes, switching of the controller cannot be performed taking into account saturation of torque and constraint of a change amount of the torque and increases in speed and accuracy are difficult. There is also a problem in that the control inputs become discontinuous during the switching and a shock is caused. The related art also discloses the technology for interpolating the control inputs before and after the switching using the filter function unit. However, because characteristics of the controlled object are not considered during the interpolation, there is also a problem in that an increase in accuracy is difficult.

The present invention has been devised in view of the problems explained above and it is an object of the present invention to provide a motor control apparatus that uses not only a present target value but also a past target value, causes a motor to follow the target values at high speed and high accuracy while satisfying constraints on a control input and a change amount of the control input in response to an arbitrary position command, and does not excite vibration during a stop.

Solution to Problem

In order to solve the aforementioned problems, a motor control apparatus according to one aspect of the present invention is configured to include: a reference model unit configured to generate, on the basis of a target value, which a control output of a controlled object including a motor should be caused to follow, a model output representing a desired operation of the controlled object and a model input for driving the controlled object to the desired operation; a feedback control unit configured to receive the control output and the model output and generate a feedback input for causing the control output to follow the model output; and a model input adder configured to add up the model input and the feedback input and generate a control input to the controlled object, wherein the reference model unit further includes: a target-value storing unit configured to retain, as a target value vector, a present value of the target value and one or a plurality of past values of the target value; a numerical model configured to simulate the characteristic of the controlled object and generate the model output and a state variable on the basis of the model input; a model controller configured to generate the model input on the basis of the target value vector and the state variable; and a model-controller determining unit configured to determine the model controller from a predetermined plurality of candidates of the model controller on the basis of the target value vector and the state variable.

Advantageous Effects of Invention

According to the present invention, it is possible to obtain a motor control apparatus that, in response to a command that variously changes, uses not only a present target value but also a past target value, changes characteristics of a controller during motor driving to cause a motor to follow the target values at high speed and high accuracy, and does not excite vibration during a stopped state.

DESCRIPTION OF EMBODIMENTS

Embodiments of a motor control apparatus according to the present invention are explained in detail below with reference to the drawings. Note that the present invention is not limited by the embodiments.

First Embodiment

Figure 1:
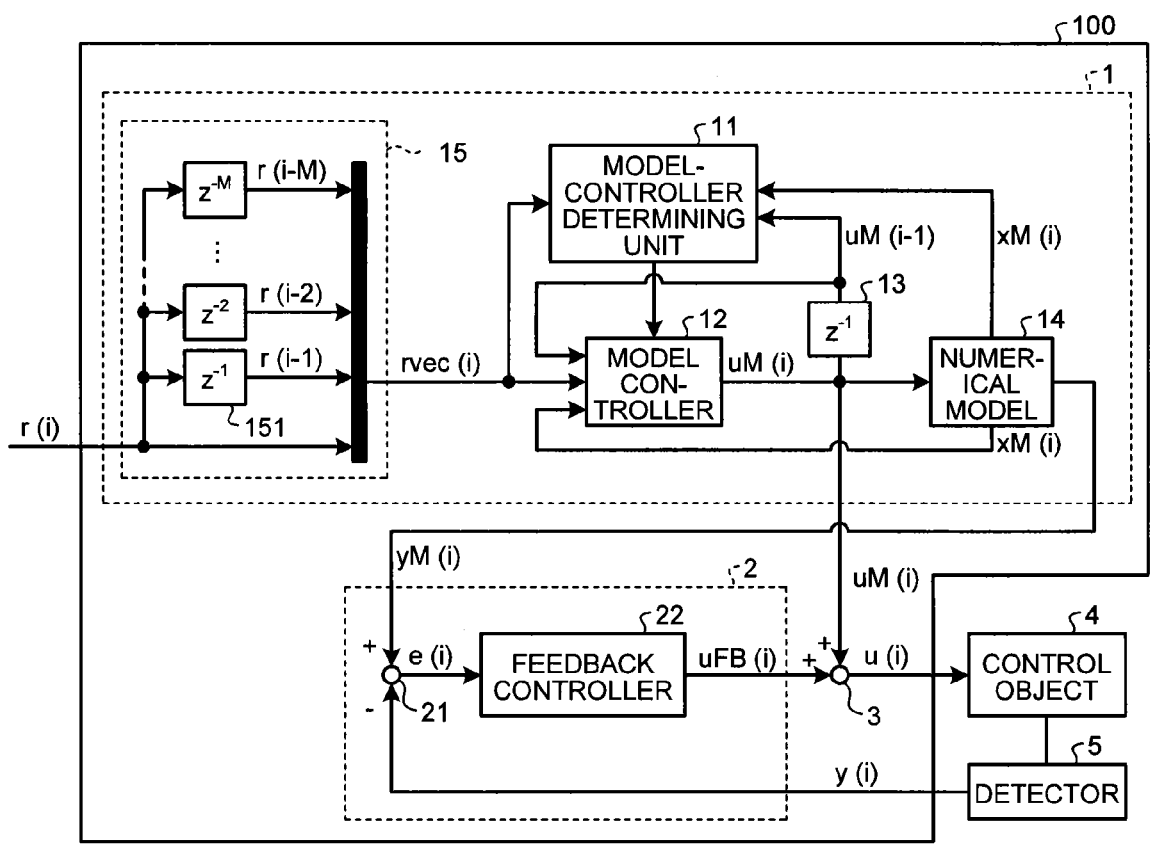
FIG. 1 a block diagram of the configuration of a motor control apparatus according to a first embodiment of the present invention.

A motor control apparatus 100 according to a first embodiment of the present invention is explained with reference to FIG. 1 to FIG. 3. FIG. 1 is a block diagram of the configuration of the motor control apparatus 100 according to the first embodiment of the present invention. Note that, in the following explanation, in the figures, the same reference numerals and signs denote the same or equivalent sections.

As shown in FIG. 1, the motor control apparatus 100 according to the first embodiment of the present invention includes a reference model unit 1, a feedback control unit 2, and a model input adder 3. A target value r(i) for a control output y(i) of a controlled object 4 output by a detector 5 representing the position and the speed of a machine to be driven or the position and the speed of a motor for driving the machine is input to the motor control apparatus 100 from the outside. The motor control apparatus 100 calculates a control input u(i) representing torque, an electric current, and the like of the motor such that the control output y(i) output from the detector 5 of the controlled object 4 follows the target value r(i). The calculated control input u(i) is output from the motor control apparatus 100 to the controlled object 4. Note that i used in the signs represents a step number.

The controlled object 4 includes a machine load and a motor such as a rotary motor or a linear motor that drives the machine load. The control input u(i), which is explained later, is applied to the motor of the controlled object 4 to cause the machine load to perform a desired operation.

The detector 5 is an encoder or a linear scale. The detector 5 detects present position information and speed information of the rotary motor or the linear motor included in the controlled object 4, present position information and speed information of the machine load, or the like and outputs the present position information and the speed information to the feedback control unit 2 as the control output y(i).

If the controlled object 4 and the detector 5 are collectively regarded as a controlled object including the motor, an input to the controlled object is the control input u(i) and an output from the controlled object is the control output y(i).

The reference model unit 1, to which the target value r(i) is input, outputs a model output yM(i) representing an ideal operation waveform of the controlled object 4 to the feedback control unit 2 and outputs a model input uM(i) for causing the controlled object 4 to perform an ideal operation to the model input adder 3. The reference model unit 1, to which the target value r(i) is input, includes a target-value storing unit 15 configured to store and retain the target value r(i) for a predetermined time and output stored and retained one or a plurality of past target values as target value vector rvec(i) together with the presently input target value r(i).

Further, the reference model unit 1 includes a model input memory 13 configured to store and retain the model input uM(i) for a predetermined time and output a stored value as a past model input uM'(i) and a numerical model 14 simulating characteristics of the controlled object 4 for receiving the model input uM(i) and outputting a model output yM(i) and a state variable xM(i). Further, the reference model unit 1 includes a model-controller determining unit 11 configured to receive the target value vector rvec(i) output from the target-value storing unit 15, the state variable xM(i) output from the numerical model 14, and the past model input uM'(i) output from the model input memory 13 and determine, on the basis of the input values, a model controller to be actually used out of candidates of a predetermined plurality of model controllers.

Further, the reference model unit 1 includes a model controller 12 configured to receive the target vector rvec(i), the state variable xM(i), and the past model input uM'(i), calculate, using the model controller determined by the model-controller determining unit 11, the model input uM(i) for causing the model output yM(i) to follow the target value r(i), and output the model input uM(i) to the numerical model 14 and the model input adder 3. The state variable xM(i) represents an internal state of the numerical model 14 and is an nth order (n is equal to or larger than 1) numerical vector. The model output yM(i) is a part of the state variable xM(i) of the numerical model 14 corresponding to a physical quantity that can be actually measured from the controlled object 4 such as the position or the speed or both of the position and the speed of the motor. The order of the model output yM(i) is described as m.

The feedback control unit 2 is explained. The feedback control unit 2 receives the model output yM(i) output from the reference model unit 1 and the control output y(i) output from the detector 5, calculates a feedback control input uFB(i) such that the control output y(i) follows the model output yM(i), and outputs the calculated feedback control input uFB(i) to the model input adder 3. That is, the feedback control unit 2 includes a model output subtracter 21 configured to receive the model output yM(i) and the control output y(i), calculate a difference between these values, and output a calculation result as an output deviation e(i), and a feedback controller 22 configured to receive the output deviation e(i) output from the model output subtracter 21 and output the feedback control input uFB(i) such that the output deviation e(i) becomes 0, that is, the control output y(i) follows the model output yM(i).

The model input adder 3 adds up the feedback input uFB(i) output from the feedback control unit 2 and the model input uM(i) output from the reference model unit 1 and outputs a sum of the feedback control input uFB(i) and the model input uM(i) to the controlled object 4 as the control input u(i). The model input adder 3 drives the motor attached to the controlled object 4 according to the control input u(i) and causes the control output y(i) of the controlled object 4 and the target value r(i) to coincide with each other. Consequently, the controlled object 4 follows the target value and performs a desired operation.

The operations of the components of the reference model unit 1 are explained in detail. First, the operation of the target-value storing unit 15 is explained in detail. The target-value storing unit 15 receives the target value (i), stores and retains the target value r(i) for a predetermined time, and outputs stored and retained one or a plurality of past target values to the model-controller determining unit 11 and the model controller 12 as the target value vector rvec(i) together with the presently input target value r(i).

The target-value storing unit 15 includes one or P value memories 151 (P>M). The target-value storing unit 15 inputs the target value r(i), which is input to the target-value storing unit 15, to the target value memories 151. Each of the target value memories 151 stores and retains the target value r(i) during one to M steps. In this case, the target value memory 151 stores and retains all target values input in M×Ts time, wherein Ts represents one sampling time. That is, when a present target value is represented as r(i), each of the target value memories 151 stores and retains values of r(i), r(i−1), . . . , and r(i−M−1) during one step. Note that r(i−1) represents a target value at an immediately preceding step (time that is one sampling time Ts earlier than the present time) and r(i−2) represents a target value at a second immediately preceding step. One step number is equivalent to the sampling time Ts. Storing the target value r(i) for M steps corresponds to storing and retaining the target value r(i) for M×Ts time. The past target values r(i−1), . . . , an r(i−M) output from the target value memory 151 and the resent target value r(i) are simultaneously collected, whereby the target value vector rvec(i) is output as indicated by Formula (1).

$$rvec(i) = \begin{bmatrix} r(i) \\ r(i-1) \\ \vdots \\ r(i-M) \end{bmatrix} \quad (1)$$

In the following explanation, for simplification of the explanation, the model input uM(i−1) at the immediately preceding step is used as the past model input uM'(i) and the target value memories 151 are provided by a number (i.e., M=2) for enabling storage and retention of a target value between two steps. However, this is an example. A model input to be used as the past model input is not limited to the model input at the immediately preceding step. The number of the target value memories 151 is not limited to the number for enabling storage and retention of a target value only between two steps.

The numerical model 14 calculates a state variable xM(i+1) at the next step and a model output yM(i) on the basis of the input model input uM(i) according to a discrete time state equation of the following Formula (2).

$$xM(i+1) = AxM(i) + BuM(i)$$

$$yM(i) = CxM(i) + DuM(i) \quad (2)$$

where, $$xM(i) \in R^{n \times 1}, uM(i) \in R^{1 \times 1}, yM(i) \in R^{m \times 1} \quad (3)$$

are respectively numerical vectors representing the state variable xM(i), the model input uM(i), and the model output yM(i) of the numerical model 14 at an ith step and n represents the number of states and m represents the number of outputs.

$$A \in R^{n \times n}, B \in R^{n \times 1}, C \in R^{m \times n}, D \in R^{m \times 1} \quad (4)$$

are matrices representing characteristics of the numerical model 14. A, B, C, and D shown in Formula (4) are determined to represent characteristics of the controlled object 4. However, the numerical model 14 does not need to represent all the characteristics of the controlled object 4, and the numerical model 14 only has to simulate characteristics necessary for the control output y(i) to follow the target value r(i) at high speed and high accuracy.

An example of the numerical model 14 is explained. FIG. 2 is a diagram of a two-inertia system model, which is an example of the numerical model 14 of the motor control apparatus 100 according to the first embodiment of the present invention.

Figure 2:
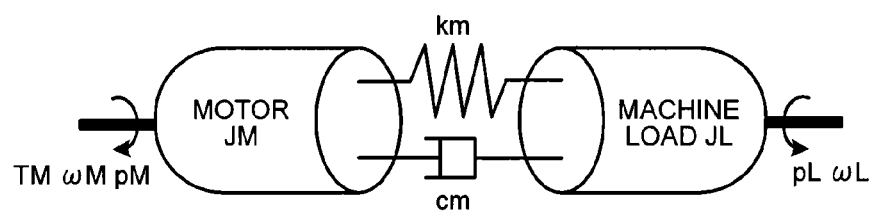
FIG. 2 is a diagram of a two-inertia system model, which is an example of a numerical model of the motor control apparatus according to the first embodiment of the present invention.

When the controlled object 4 is a characteristic having a plurality of resonances and anti-resonances, it is assumed that a two-inertia system model in which a motor drives a machine load via an elastic body such as a spring as shown in FIG. 2 is set as the numerical model 14, and a resonance and anti-resonance characteristic having a lowest frequency. In the motor control apparatus 100 in this embodiment, a vibratory model having resonance and anti-resonance such as the two-inertia system model is used as the numerical model, whereby it is possible to obtain a motor control apparatus having a high vibration suppression effect and having high speed and high accuracy. Here, it is assumed that the position and the speed of the motor attached to the controlled object 4 can be measured using the detector 5. The numerical model 14 is modeled by a vibratory machine system in this way, whereby it is possible to generate a model input that does not excite vibration.

A state equation of a continuous system of the two-inertia system model shown in FIG. 2 is represented by Formula (5) and Formula (6) shown below.

$$\frac{d}{dt}\begin{bmatrix} pM \\ \omega M \\ pL \\ \omega L \end{bmatrix} = \begin{bmatrix} 0 & 1 & 0 & 0 \\ -km/JM & -cm/JM & km/JM & cm/JM \\ 0 & 0 & 0 & 1 \\ km/JL & cm/JL & -km/JL & -cm/JL \end{bmatrix}\begin{bmatrix} pM \\ \omega M \\ pL \\ \omega L \end{bmatrix} + \begin{bmatrix} 0 \\ 1/J_M \\ 0 \\ 0 \end{bmatrix}TM \quad (5)$$

$$yM = \begin{bmatrix} 1 & 0 & 0 & 0 \\ 0 & 1 & 0 & 0 \end{bmatrix}\begin{bmatrix} pM \\ \omega M \\ pL \\ \omega L \end{bmatrix} \quad (6)$$

where, pM represents a position (rotation angle) of the motor, ωM represents a rotating speed of the motor, pL represents a position of the machine load, ωL represents speed of the machine load, JM represents moment of inertia of the motor, JL represents a moment of inertia of the machine load, TM represents a motor torque, km represents a spring constant, cm represents a coefficient of viscosity, yM represents model output of the continuous system, and d/dt represents a differential concerning time. The spring constant km only has to be determined such that a model resonant frequency ωp and a model anti-resonant frequency ωz calculated by Formula (7) and Formula (8) shown below coincide with the lowest resonant frequency and the lowest anti-resonant frequency of the controlled object 4. By determining the spring constant km in this way, the two-inertia system model can simulate characteristics of the controlled object 4.

$$\omega p = \sqrt{\frac{km}{JM + JL}} \quad (7)$$

$$\omega z = \sqrt{\frac{km}{JL}} \quad (8)$$

Actually, the numerical model 14 is a discrete time state equation as represented by Formula (2). Therefore, Formula (5) and Formula (6) are discretized to calculate the discrete time state equation, and the discrete time state equation is set as the numerical model 14. There are several systems for calculating a linear discrete time state equation like Formula (2) from a linear continuous time state equation like Formula (5) and Formula (6). As one method of the systems, there is a system for calculating the linear discrete time state equation using Formula (9), Formula (10), Formula (11), and Formula (12) shown below.

$$A = e^{A_c T_s}, \quad (9)$$

$$A_c = \begin{bmatrix} 0 & 1 & 0 & 0 \\ -km/Jm & -cm/JM & km/JM & cm/JM \\ 0 & 0 & 0 & 1 \\ km/JL & cm/JL & -km/JL & -cm/JL \end{bmatrix}$$

$$B = \int_0^{T_s} e^{A_c(T_s-\tau)} d\tau B_c, \quad (10)$$

$$B_c = \begin{bmatrix} 0 \\ 1/J_m \\ 0 \\ 0 \end{bmatrix}$$

$$C = C_c, \quad (11)$$

$$C_c = \begin{bmatrix} 1 & 0 & 0 & 0 \\ 0 & 1 & 0 & 0 \end{bmatrix}$$

$$D = D_c, \quad (12)$$

$$D_c = 0$$

where, $e^{A_c T_s}$ and $e^{A_c(T_s-\tau)}$ respectively represent exponentials of $A_c T_s$ and $A_c(T_s-\tau)$. Ts represents sampling time. When the two-inertia system model represented by Formula (5) and Formula (6) is used as the numerical model 14 as in this embodiment, the state variable xM(i) shown in FIG. 1 is a position pM(i) of the motor, speed ωM(i) of the motor, a position pL(i) of the machine load, and speed ωL(i) of the machine load at respective steps, and the model input uM(i) is motor torque TM(i). In this embodiment, it is assumed that the position pM(i) of the motor and the speed ωM(i) of the motor can be measured. Therefore, the model output yM(i) is the position pM(i) of the motor and the speed ωM(i) of the motor, as indicated by Formula (13).

$$xM(i) = \begin{bmatrix} pM(i) \\ \omega M(i) \\ pL(i) \\ \omega L(i) \end{bmatrix}, \quad (13)$$

$$uM(i) = TM(i),$$

$$yM(i) = \begin{bmatrix} pM(i) \\ \omega M(i) \end{bmatrix}$$

Note that the above explanation is an example of the numerical model 14. The numerical model 14 is not limited to Formula (9), Formula (10), Formula (11), and Formula (12). The state variable xM(i), the model input uM(i), and the model output yM(i) are not limited to Formula (13).

The operation of the model controller 12 in the reference model unit 1 is explained in detail. A configuration example of the model controller 12 used for the operation explanation is shown in FIG. 3.

The model controller 12 includes a model sub-controller 121 and a model input change amount adder 122. A model controller is determined out of a predetermined plurality of candidates by the model-controller determining unit 11 on the basis of the target value vector rvec(i), the model input uM(i−1) at the immediately preceding step, and the state variable xM(i) output from the numerical model 14. The model controller determined by the model-controller determining unit 11 is input to the model sub-controller 121. The model sub-controller 121 calculates a model input change amount ΔuM (i) on the basis of the model controller determined by the model-controller determining unit 11 such that the model output yM(i) present in the state variable xM(i) follows the target value r(i) present in the target vector rvec(i). The model sub-controller 121 outputs the calculated model input change amount ΔuM(i) to the model input change amount adder 122. The model input change amount adder 122 adds up the model input change amount ΔuM(i) output from the model sub-controller 121 and the model input uM(i−1) at the immediately preceding step and outputs a sum of the model input change amount ΔuM(i) and the model input uM(i−1) to the model input memory 13, the numerical model 14, and the model input adder 3 as the model input uM(i).

In an example explained below, the model sub-controller 121 calculates the model input change amount ΔuM(i) by adding up a state feedback and an offset. When the model sub-controller 121 calculates the model input change amount ΔuM(i) by adding up the state feedback and the offset, the model sub-controller 121 calculates the model input change amount ΔuM(i) based on the target value vector rvec(i), multiplication of the model input uM(i−1) at the immediately preceding step and the state variable xM(i) of the numerical model 14 with a model gain Ki, and also addition of a model offset Gi to those elements. In this case, the calculation by the model sub-controller 121 can be represented by Formulas (14), (15), and (16) shown below.

$$\Delta uM(i) = Ki \begin{bmatrix} xM(i) \\ uM(i-1) \end{bmatrix} + Gi + Kri\ r(i) + Kvri\ vr(i) + Kari\ ar(i) \quad (14)$$

$$vr(i) := \frac{r(i) - r(i-1)}{T_s} \quad (15)$$

$$ar(i) := \frac{vr(i) - vr(i-1)}{T_s} = \frac{r(i) - 2r(i-1) + r(i-2)}{T_s^2} \quad (16)$$

where, vr(i) represents a target value speed and ar(i) represents a target value acceleration. The target value speed vr(i) and the target value acceleration ar(i) are respectively values equivalent to a first-order difference and a second-order difference of the target value r(i). Further, Kri represents a target value model gain, Kvri represents target value speed model gain, and Kari represents target value acceleration model gain. The model offset Gi is sometimes unnecessary but is introduced for later use. A plurality of candidates are set for each of the model gain Ki, the model offset Gi, the target value speed model gain Kvri, and the target value acceleration model gain Kari by a system explained below. Each of the model gain Ki, the model offset Gi, the target value speed model gain Kvri, and the target value acceleration model gain Kari is determined out of the candidates by the model-controller determining unit 11, and the thus determined value is used in Formula (14). In Formula (14), a term concerning the target value r(i) is separately described. However, actually, the model input change amount ΔuM(i) only has to be generated from a deviation between the target value r(i) and the state variable xM(i), which is caused to follow the target value r(i). When the model input change amount ΔuM(i) is generated from the deviation between the target value r(i) and the state variable xM(i) which is caused to follow the target value r(i), the target model gain Kri is automatically determined from the model gain Ki.

The model input change amount adder 122 adds up the model input change amount ΔuM(i) output from the model sub-controller 121 and the model input uM(i−1) at the immediately preceding step as represented by Formula (17) shown below and outputs a sum of the model input change amount ΔuM(i) and the model input uM(i−1) to the model input memory 13, the numerical model 14, and the model input adder 3 as the model input uM(i). That is, the model input change amount adder 122 calculates the model input uM(i) by integrating the model input change amount ΔuM(i).

$$uM(i) = uM(i-1) + \Delta uM(i) \quad (17)$$

The model controller 12 performs the calculation explained above to once calculate the model input change amount ΔuM(i) with the model sub-controller 121 and integrates the model input change amount ΔuM(i) and outputs the model input uM(i) according to the operation of the model input change amount adder 122. Consequently, the model-controller determining unit 11 and the model controller 12 can learn a value of the model input change amount ΔuM(i) in addition to the model input uM(i). The model-controller determining unit 11 can determine the model sub-controller 121 out of a plurality of candidates such that the model input uM(i) and the model input change amount ΔuM(i) do not exceed predetermined values. That is, even if the model-controller determining unit 11 switches the model sub-controller 121 to another candidate to cause the model output yM(i) output from the numerical model 14 to follow the target value r(i) at high speed and high accuracy or to prevent the model input change amount ΔuM(i) from exceeding a predetermined value, the model input uM(i) can be calculated without becoming discontinuous.

A discrete time state equation in which the model input change amount ΔuM(i) is regarded as being a new input and the model input change amount adder 122 and the model input memory 13 are combined with the numerical model 14 can be represented by Formula (18) shown below. In the formula, I represents a unit matrix and 0 represents a zero matrix. The numbers of rows and columns of the matrixes are appropriately determined.

$$\begin{bmatrix} xM(i+1) \\ uM(i) \end{bmatrix} = \begin{bmatrix} A & B \\ 0 & I \end{bmatrix} \begin{bmatrix} xM(i) \\ uM(i-1) \end{bmatrix} + \begin{bmatrix} B \\ I \end{bmatrix} \Delta uM(i) \quad (18)$$

$$yM(i) = \begin{bmatrix} C & D \end{bmatrix} \begin{bmatrix} xM(i) \\ uM(i-1) \end{bmatrix} + D\Delta uM(i)$$

A discrete time state equation that takes into account storage of the target value r(i) by the target-value storing unit 15 in addition to the discrete time state equation of Formula (18) can be represented by Formula (19) shown below.

$$\begin{bmatrix} xM(i+1) \\ uM(i) \\ \tilde{r}(i+1) \\ \tilde{vr}(i+1) \\ \tilde{ar}(i+1) \end{bmatrix} = \begin{bmatrix} A & B & 0 & 0 & 0 \\ 0 & I & 0 & 0 & 0 \\ 0 & 0 & I & T_s & 0 \\ 0 & 0 & 0 & I & T_s \\ 0 & 0 & 0 & 0 & I \end{bmatrix} \begin{bmatrix} xM(i) \\ uM(i-1) \\ r(i) \\ vr(i) \\ ar(i) \end{bmatrix} + \begin{bmatrix} B \\ I \\ 0 \\ 0 \\ 0 \end{bmatrix} \Delta iM(i) \quad (19)$$

$$yM(i) = \begin{bmatrix} C & D & 0 & 0 & 0 \end{bmatrix} \begin{bmatrix} xM(i) \\ uM(i-1) \\ r(i) \\ vr(i) \\ ar(i) \end{bmatrix} + D\Delta uM(i)$$

In Formula (19), r̃(i+1) represents target value prediction value at the immediately following step, ṽr(i+1) represents target value speed prediction value at the immediately following step, and ãr(i+1) represents target value acceleration prediction value at the immediately following step. In Formula (19), vr(i) represents target value speed and ar(i) represents target value acceleration. The target value speed vr(i) and the target value acceleration ar(i) can be respectively calculated using the target value r(i−1) at the immediately preceding step and the target value r(i−2) at the second immediately preceding step stored by the target-value storing unit 15 according to Formula (15) and Formula (16). Note that Formula (19) is used by the model-controller determining unit 11 to calculate candidates of a predetermined plurality of the model controllers 12 or model sub-controllers 121 explained below.

The model gain Ki, the model offset Gi, the target value model gain Kri, the target value speed model gain Kvri, and the target value acceleration model gain Kari of the model sub-controller 121 used in Formula (14) can be designed such that the model output yM(i) calculated using the discrete time state equation of Formula (19) follows the target value r(i).

Figure 3:
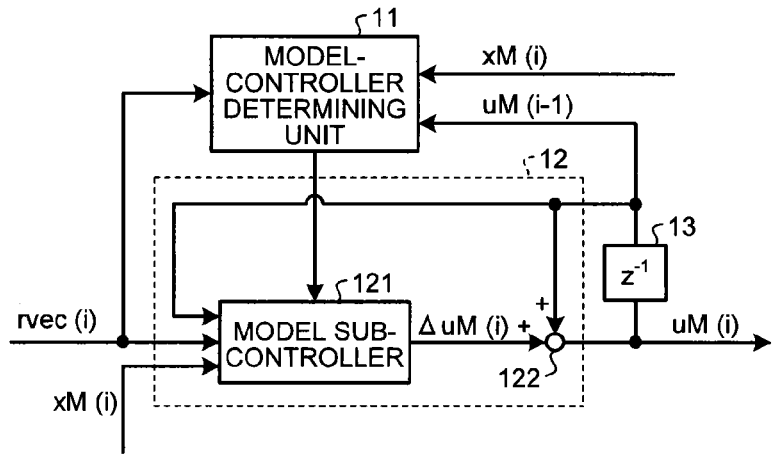
FIG. 3 is a block diagram of the configuration of a model controller of the motor control apparatus according to the first embodiment of the present invention.

Note that a specific calculation method of the model controller 12 is not limited by the calculation method shown in the configuration of FIG. 3. Calculation equivalent to the calculation explained above can be performed by various configurations. That is the model controller 12 can perform calculation equivalent to the calculation explained above by performing calculation based on the model input uM(i) at the immediately preceding step, which is an output of the model input memory 13, together with the target value vector rvec(i) and the state variable xM(i) of the numerical model 14, and perform calculation taking into account the model input change amount ΔuM(i).

A method of determining the model gain Ki, the model offset Gi, the target value model gain Kri, the target value speed model gain Kvri, and the target value acceleration model gain Kari by the model-controller determining unit 11 is explained in detail.

The model-controller determining unit 11 determines, out of a predetermined plurality of candidates, the model gain Ki, the model offset Gi, the target value model gain Kri, the target value speed model gain Kvri, and the target value acceleration model gain Kari on the basis of the target value vector rvec(i), the state variable xM(i), and the model input uM(i−1) at the immediately preceding step. Note that the target value model gain Kri is automatically determined from the model gain Ki as explained above. A method of determining the model gain Ki, the model offset Gi, the target value speed model gain Kvri, and the target value acceleration model gain Kari is explained using a gain map describing a correspondence relation between the target value vector rvec(i), the state variable xM(i), and the model input uM(i−1) at the immediately preceding step and the model gain Ki, the target value speed model gain Kvri, and the target value acceleration model gain Kari, and also an offset map describing a correspondence relation between the target value vector rvec(i), the state variable xM(i), and the model input uM(i−1) at the immediately preceding step and the model offset Gi.

For the gain map and the offset map, those explained below are conceivable. First, as candidates, a model gain Ka, a model offset Ga, a target value speed model gain Kvra, and a target value acceleration model gain Kara for obtaining a response in which the control output y(i) is caused to follow the target value r(i) without exciting vibration and the control output y(i) quickly follows the target value r(i), and a model gain Kb, a model offset Gb, a target value speed model gain Kvrb, and a target value acceleration model gain Karb for obtaining a response in which the control output y(i) is cause to follow the target value r(i) without exciting vibration but the control output y(i) slowly follows the target value r(i) are prepared. It is assumed that {Ka, Kvra, Kara, Kb, Kvrb, Karb} is stored in the gain map and {Ga, Gb} is stored in the offset map.

In the motor control apparatus that drives the industrial machine, in order to cause the control output y(i) to quickly follow the target value r(i) without exciting vibration, a large control input u(i), model input uM(i), or model input change amount ΔuM(i) is necessary. When the control output y(i) is caused to slowly follow the target value r(i), a small control input u(i), model input uM(i), or model input change amount ΔuM(i) is sufficient. Therefore, usually, the model-controller determining unit 11 determines {Ka, Kvra, Kara} from the gain map and determines Ga from the offset map such that the control output u(i) quickly follows the target value r(i) and outputs {Ka, Kvra, Kara} and Ga to the model controller 12. If the control input u(i), the model input uM(i), or the model input value ΔuM(i) is likely to exceed a predetermined value, the model-controller determining unit 11 determines {Kb, Kvrb, Karb} from the gain map and determines Gb from the offset map and outputs them to the model controller 12.

Consequently, when the control input u(i), the model input uM(i), or the model input value ΔuM(i) does not exceed the predetermined value, a response is obtained in which the control output y(i) quickly follows the target value r(i) without vibration. When the control input u(i), the model input uM(i), or the model input value ΔuM(i) is likely to exceed the predetermined value, a response is obtained in which the control output y(i) slowly follows the target value r(i) but there is no vibration and the model input uM(i) or the model input change amount ΔuM(i) does not exceed the predetermined amount. A method of determining the candidates {Ka, Ga, Kvra, Kara} and {Kb, Gb, Kvrb, Karb} of the various gains and offsets can be designed by using a control system design method such as a pole placement method or loop shaping with respect to the discrete time state equation of Formula (19). In this embodiment, the method is not particularly limited. The number of sets of gains is not limited to two sets of the gain in which the control output y(i) quickly follows the target value r(i) and the gain in which the control output y(i) slowly follows the target value r(i) and can be three or more sets.

In the design by the reference example explained above, design of the numbers of the model gains Ki, the model offsets Gi, the target value speed model gains Kvri, and the target value acceleration model gains Kari, and the model gains {Ka, Kb}, the model offsets {Ga, Gb}, the target value speed model gains {Kvra, Kvrb}, and the target value acceleration model gain {Kara, Karb} needs to be performed in a trial-and-error manner to some extent. Details of a system for determining these gains need to be separately designed. On the other hand, by performing application of model prediction control as explained below, it is possible to systematically determine a plurality of values and determination conditions of the model gain Ki, the model offset Gi, the target value speed model gain Kvri, and the target value acceleration model gain Kari.

In the model prediction control, it is known that a controller that switches a gain and an offset according to offline optimization calculation is designed (reference material: F. Borrelli: Constrained Optimal Control of Linear and Hybrid Systems, Springer Verlag, LNCIS 290 (2003)).

The reference material proposes, for a control method not limited to the motor control apparatus, a system for designing a piecewise affine state feedback control system while using the model prediction control to thereby minimize a certain evaluation function while satisfying constraints. The piecewise affine state feedback control system is a control system for calculating an input applied to a machine on the basis of a state of the machine to be controlled, multiplication with a gain, and an addition with an offset and for switching the gain and the offset according to a state of the machine. However, in the reference material, because the piecewise affine state feedback control system is designed in a section equivalent to the feedback controller 22 in this embodiment, it is necessary to measure or estimate all states of the machine to be controlled. Therefore, a large number of sensors are necessary or an observer needs to be built, which is not practical.

However, the problems can be solved by using this method for generating a predetermined plurality of candidates of the model controller 12. Generation of the gain map and the offset map by the model prediction control is explained below.

When a controller is designed by the model prediction control, a prediction model, a control constraint, an evaluation function need to be set, so that the prediction model, the control constraint, and the evaluation function are explained below.

The prediction model used in designing the controller is explained. In this embodiment, because the model input change amount $\Delta uM(i)$ is taken into account and the past target values $r(i-1)$ and $r(i-2)$ output from the target-value storing unit 15 are also taken into account, the discrete time state equation represented by Formula (19) is set as the prediction model used in designing the controller.

The control constraint is explained. In this embodiment, the control constraint is that the model input $uM(i)$ and the model input change amount $\Delta uM(i)$ do not exceed the predetermined values in the respective steps. That is, a control constraint indicated by Formula (20) shown below is imposed.

$$|uM(i)| \leq uM\max, |\Delta uM(i)| \leq \Delta uM\max, i=0,1,2\ldots \quad (20)$$

where, uMax represents a maximum of an absolute value of the model input $uM(i)$ and $\Delta u$Max represents a maximum of an absolute value of the model input change amount $\Delta uM(i)$.

Lastly, the evaluation function is explained. In this embodiment, the evaluation function is Formula (21) shown below.

$$\sum_{l=0}^{N-1}\left(\left\|Q\begin{bmatrix}xM(i+1)\\uM(i+l-1)\end{bmatrix}\right\|_d + \|R\Delta uM(i+1)\|_d\right) + \left\|PN\begin{bmatrix}xM(i+N)\\uM(i+N-1)\end{bmatrix}\right\|_d = \quad (21)$$

$$\sum_{l=0}^{N-1}\left(\left\|\begin{bmatrix}Q & 0\\0 & 0\end{bmatrix}\begin{bmatrix}xM(i+1)\\uM(i+l-1)\\\tilde{r}(i+1)\\\tilde{v}r(i+1)\\\tilde{a}r(i+1)\end{bmatrix}\right\|_d + \|R\Delta uM(i+1)\|_d\right) +$$

$$\left\|\begin{bmatrix}PN & 0\\0 & 0\end{bmatrix}\begin{bmatrix}xM(i+N)\\uM(i+N-1)\\\tilde{r}(i+N)\\\tilde{v}r(i+N)\\\tilde{a}r(i+N)\end{bmatrix}\right\|_d$$

A minimization problem (Formula (22) shown below) for calculating the model input change amount $\Delta uM(i)$ for minimizing the evaluation function of Formula (21) is examined. In the formula, $\tilde{r}(i)=r(i)$, $\tilde{v}r(i)=vr(i)$, and $\tilde{a}r(i)=ar(i)$.

$$\min_{\Delta uM(i),\ldots,\Delta uM(i+N-1)} \sum_{l=0}^{N-1}\left(\left\|\begin{bmatrix}Q & 0\\0 & 0\end{bmatrix}\begin{bmatrix}xM(i+1)\\uM(i+l-1)\\\tilde{r}(i+1)\\\tilde{v}r(i+1)\\\tilde{a}r(i+1)\end{bmatrix}\right\|_d + \right. \quad (22)$$

$$\left. \|R\Delta uM(i+1)\|_d \right) + \left\|\begin{bmatrix}PN & 0\\0 & 0\end{bmatrix}\begin{bmatrix}xM(i+N)\\uM(i+N-1)\\\tilde{r}(i+N)\\\tilde{v}r(i+N)\\\tilde{a}r(i+N)\end{bmatrix}\right\|_d$$

subject to $|uM(i+l)| \leq uM\max, |\Delta uM(i+l-1)| \leq \Delta uM\max$ $$\begin{bmatrix}xM(i+1)\\uM(i)\\\tilde{r}(i+1)\\\tilde{v}r(i+1)\\\tilde{a}r(i+1)\end{bmatrix} = \begin{bmatrix}A & B & 0 & 0 & 0\\0 & I & 0 & 0 & 0\\0 & 0 & I & Ts & 0\\0 & 0 & 0 & I & Ts\\0 & 0 & 0 & 0 & I\end{bmatrix}\begin{bmatrix}xM(i)\\uM(i-1)\\r(i)\\vr(i)\\ar(i)\end{bmatrix} + \begin{bmatrix}B\\I\\0\\0\\0\end{bmatrix}\Delta uM(i) \forall l \in [0 \ N-1]$$

where, d represents an order of a norm takes any one of values 1, 2, and $\infty$. N represents a parameter called horizon and used for determining to which degree future is predicted. The parameter N is one of design parameters. Q, R, and PN represent weights and are design parameters. Note that, in Formula (22), a terminal constraint set of a state variable and a terminal constraint set of a model input are not shown in Formula (22). However, it is possible to obtain the effects of this embodiment without using the terminal constraint sets. The reference material indicates that, by appropriately setting the terminal constraint set of the state variable and the terminal constraint set of the model input, stability can be guaranteed by an input obtained by solving the problem of Formula (22). Therefore, by using the terminal constraint set of the state variable and the terminal constraint set of the model input, it is possible to prevent the model input from diverging to make an operation unstable in the motor control apparatus also in this embodiment.

It is known that, in the case of d=1, $\infty$, the problem of minimizing the evaluation function can be returned to a multi-parametric linear programming problem like Formula (23) shown below according to appropriate conversion and introduction of an auxiliary variable.

$$\min_{v} c^T v \quad (23)$$

subject to $Gv \leq W + E\begin{bmatrix}xM(i)\\uM(i-1)\end{bmatrix}$ where, $xM(i)$ represents a state variable at an "ith" step, $uM(i-1)$ represents a model input at the immediately preceding step, v is configured by an input string [ΔyM(i)m ΔuM(i+1), ..., and ΔuM(i+N−1)] and an auxiliary variable.

When the minimization problem of Formula (23) is solved, a plurality of candidates of the model gain Ki, the model offset Gi, the target value speed model gain Kvri, and the target value acceleration model gain Kari are determined. These gains are determined out of the candidates according to the state variable xM(i) of the numerical model 14, the model input uM(i−1) at the immediately preceding step, the target value speed vr(i), and the target value acceleration ar(i). At the same time, a determination condition Pi for determining the model gain Ki, the model offset Gi, the target value speed model gain Kvri, and the target value acceleration model gain Kari out of the candidates is also determined. The model input uM(i) can be calculated by calculating Formula (24), Formula (25), and Formula (26) shown below using the model gain Ki, the model offset Gi, the target value speed model gain Kvri, the target value acceleration model gain Kari, and the determination condition Pi calculated as explained above.

$$\Delta uM(i) = Ki \begin{bmatrix} xM(i) \\ uM(i-1) \end{bmatrix} + Gi + Kri\ r(i) + Kvri\ vr(i) + Kari\ ar(i) \quad (24)$$

$$\text{if } \begin{bmatrix} xM(i) \\ uM(i-1) \\ r(i) \\ vr(i) \\ ar(i) \end{bmatrix} \in Pi \quad (25)$$

$$uM(i) = uM(i-1) + \Delta uM(i) \quad (26)$$

That is, the determination condition Pi associating the candidates of the model gain Ki, the model offset Gi, the target value speed model gain Kvri, and the target value acceleration model gain Kari, the state variable xM(i) of the numerical model 14, the model input uM(i−1) at the immediately preceding step, the target value r(i), the target value speed vr(i), and the target value acceleration ar(i), and the model gain Ki, the model offset Gi, the target value speed model gain Kvri, and the target value acceleration model gain Kari is automatically designed. Note that the determination condition Pi can be divided into a gain map representing the candidates and determination conditions of the model gain Ki, the target value speed model gain Kvri, and the target value acceleration model gain Kari and an offset map representing the candidates and determination conditions of the model offset Gi.

Therefor, the model-controller determining unit 11 includes the gain map and the offset map obtained as a result of solving the minimization problem of Formula (22) or the Formula (23) in advance. The state variable xM(i) of the numerical model 14, the model input uM(i−1) at the immediately preceding step, and the target value vector rvec(i) are input to the model-controller determining unit 11 at respective sampling times. The model-controller determining unit 11 determines the model gain Ki, the model offset Gi, the target value speed model gain Kvri, and the target value acceleration model gain Kari by referring to the state variable xM(i), the model input uM(i−1) at the immediately preceding step, and the target value r(i), the target value speed vr(i), and the target value acceleration ar(i), which can be acquired from the target value vector vrec(i), as the determination condition Pi. Further, the model-controller determining unit 11 outputs the model gain Ki, the model offset Gi, the target value speed model gain Kvri, and the target value acceleration model gain Kari determined as explained above to the model controller 12.

As explained above, the model controller 12 calculates, according to Formula (24) and Formula (25), the model input uM(i) on the basis of a sum of a value obtained by adding up all of the state variable xM(i) of the numerical model 14, a product of the model input uM(i−1) at the immediately preceding step and the model gain Ki, a product of the target value r(i) and the target value model gain Kri, a product of the target value speed vr(i) and the target value speed model gain Kvri, and a product of the target value acceleration ar(i) and the target value acceleration model gain Kari and the model offset Gi.

The model input uM(i) and the model input change amount ΔuM(i) of Formula (24), Formula (25), and Formula (26) are derived as a result of the minimization problem of Formula (22) or Formula (23). Therefore, the model input uM(i) and the model input change amount ΔuM(i) satisfying the control constraint (20) of the minimization problem are derived. That is, when absolute values of the model input uM(i) and the model input change amount ΔuM(i) are equal to or larger than predetermined values, the model gain Ki, the model offset Gi, the target value speed model gain Kvri, and the target value acceleration model gain Kari are switched. A gain map and an offset map describing candidate values of the model gain Ki, the model offset Gi, the target value speed model gain Kvri, and the target value acceleration model gain Kari and conditions for switching these values are also automatically calculated. When the model input uM(i) is not equal to or larger than a predetermined value, this means that the control constraint of the control input is satisfied. When the model input change amount ΔuM(i) is not equal to or larger than a predetermined value, this means that, even if the model gain Ki, the model offset Gi, the target value speed model gain Kvri, and the target value acceleration model gain Kari are changed on the basis of the gain map and the offset map generated from the determination condition Pi, the model input uM(i) does not suddenly change.

The model offset Gi is derived as a result of solving the Formula (22) and Formula (23), which are the minimization problem. Therefore, when the model offset Gi is added, a control system that obtains a high-speed and high-accuracy response can be realized in terms of reducing the evaluation function of Formula (21) rather than when only the model gain Ki, the target value speed model gain Kvri, and the target value acceleration model gain Kari are used.

Effects obtained by the first embodiment explained above are explained below.

With the motor control apparatus 100 according to this embodiment, by determining the model controller 12 out of a predetermined plurality of candidates using the past model uM'(i), the model controller 12 can be determined taking into account the model input change amount ΔuM(i) or a change in the control input. That is, the model input change amount ΔuM(i) can be set as a new input to calculate the model input uM(i) using the past model input uM'(i). As a result, the model-controller determining unit 11 appropriately performs determination of the model controller 12. Consequently, it is possible to realize a control system in which not only the model input uM(i) but also the model input change amount ΔuM(i) does not become larger than the predetermined value and the control output y(i) quickly follows the target value r(i) without vibrating. That is, it is possible to obtain a high-speed and high-accuracy motor control apparatus while preventing torque saturation (current saturation), torque change rate saturation, and voltage saturation having a close relation with the torque change rate saturation. Even if the model controller 12 is switched for control performance improvement, it is possible to prevent the model uM(i) from suddenly changing.

That is, by performing determination of a model controller such that a model input is smaller than a predetermined value, it is possible to prevent occurrence of torque saturation. By performing determination of the model controller such that a change amount of the model input is smaller than a predetermined value, it is possible to prevent occurrence of voltage saturation and reduce a shock that occurs when the model controller is switched.

Further, by feeding back the past model input uM'(i) to the model controller 12, it is possible to equivalently convert the past model input uM'(i) into a discrete time state equation of Formula (18) and Formula (19) having the model input change amount ΔuM(i) as a new input. Consequently, it is possible to take into account the input change amount ΔuM(i) in the minimization problem (22).

By storing the past target values r(i−1), r(i−2), . . . with the target-value storing unit 15, it is possible to also taken into account the target value speed vr(i) and the target value acceleration ar(i) when the model input change amount ΔuM(i) is calculated. It is possible to design a control system in which the control output y(i) more quickly follows the target value r(i) than when these values are not used. That is, by switching the model controller using not only the present target values but also the past target values, generating a model input, and performing control, it is made possible to obtain a motor control apparatus having a higher response than when the model controller is switched using only the present target values.

Further, the model-controller determining unit 11 determines the model gain Ki, the model offset Gi, the target value speed model gain Kvri, and the target value acceleration model gain Kari according to the past model input uM'(i), the state variable xM(i) of the numerical model 14, and the target value vector rvec(i). Consequently, it is possible to realize a motor control apparatus in which the model input uM(i) and the model input change amount ΔuM(i) do not exceed the predetermined values and a high-speed and high-accuracy response is obtained. That is, it is possible to obtain a high-response motor control apparatus using an offset amount in addition to a model gain.

The gain map and the offset map describing the candidates and the determination conditions of the model gain Ki, the model offset Gi, the target value speed model gain Kvri, and the target value acceleration model gain Kari using the target value vector rvec(i) have been calculated offline in advance. Offline calculation is only the calculation of Formula (25) for determining the model gain Ki, the model offset Gi, and the target value speed model gain Kvri using the target value vector rvec(i) referring to the gain map and the offset map and the calculation of the model input uM(i) by Formula (24) and Formula (26). By specifying the gain map and the offset map in advance in this way, it is possible to reduce a calculation time to be shorter than a calculation time in online model prediction control for calculating the minimization problem of Formula (22) at the respective steps and perform calculation of the model input change amount ΔuM(i). Therefore, it is possible to considerably reduce online computational complexity, set a sampling time to be earlier, and improve performance of the control system.

Note that, in the explanation in the first embodiment, d=1, ∞. However, when d=2, the multi-parametric linear programming problem of Formula (23) is simply changed to a multi-parametric quadratic programming problem. A map Pi describing candidate values and determination conditions of respective gains for switching the model gain Ki, the model offset Gi, the target value speed model gain Kvri, and the target value acceleration model gain Kari is output using the state variable xM(i) of the numerical model 14, the model input uM(i−1) at the immediately preceding step, and the target value vector rvec(i) as an optimum solution of the minimization problem.

In the above explanation, the model-controller determining unit 11 switches the target value model gain Kri, the target value speed model gain Kri, and the target value acceleration model gain Kari using the gain map or determines the target value model gain Kri, the model offset Gi, the target value speed model gain Kvri, and the target value acceleration model gain Kari using the gain map and the offset map. However, the model-controller determining unit 11 can determine the model gain Ki, the model offset Gi, the target value speed model gain Kvri, and the target value acceleration model gain Kari using a function including the state variable xM(i) of the numerical model 14, the target value vector rvec(i), and the past model input uM'(i) as variables.

In the above explanation, Formula (20) is used as the control constraint. However, the control constraint is not limited to this. Specifically, the control constraint concerning the state variable xM(i) of the numerical model 14, the model input uM(i), and the model input change amount ΔuM(i) only have to be a convex constraint. For example, the control constraint can be applied to the state variable xM(i) of the numerical model 14 as well.

When the model gain Ki, the target value speed model gain Kvri, and the target value acceleration model gain Kari or the model gain Ki, the model offset Gi, the target value speed model gain Kvri, and the target value acceleration model gain Kari are determined, not all of the state variable xM(i) of the numerical model 14, the target value vector rvec(i), and the past model input uM'(i) need to be used. But only a part of these kinds of information only has to be used.

As explained above, by performing determination of the model gains or the model gains and the model offsets such that the model input is smaller than the predetermined value, it is possible to prevent occurrence of torque saturation. By performing determination of the model gains or the model gains and the model offsets such that the change amount of the model input is smaller than the predetermined values, it is possible to prevent occurrence of voltage saturation and reduce a shock that occurs when the model controller is switched.

In the above explanation, the model input uM(i−1) at the immediately preceding step is used as the past model input uM'(i). However, the past model input uM'(i) is not always limited to the model input uM(i−1) at the immediately preceding step. For example, it is easy to give the same effects using, for example, a model input before a plurality of steps. Effects same as the effects of this embodiment can be obtained when a past model input other than the model input at the immediately preceding step is used as the past model input.

In the above explanation, the model input uM(i) is generated using the target value speed vr(i) and the target value acceleration ar(i). However, the model input uM(i) can be generated without using these values. That is, the model gain Ki and the target value model gain Kri automatically determined according to the model gain Ki can be determined according to the target value vector Kvri, the state variable xM(i), and the model input uM(i−1) at the immediately preceding step. The target value speed model gain Kvri and the target value acceleration model gain Kari can be always put as 0 to calculate Formula (14) and Formula (24). In this system, effects same as the effects in the first embodiment can be obtained.

In the above explanation, the model controller 12 includes the model sub-controller 121, calculates the model input change amount ΔuM(i), and calculates the model input uM(i) by adding the model input uM(i−1) at the immediately preceding step to the model input change amount ΔuM(i). However, when it is unnecessary to take into account a control constraint |ΔuM(i)|<=ΔuMmax of a model input change amount, the model controller 12 can directly calculate the model input uM(i) without calculating the model input change amount ΔuM(i). That is, the model controller 12 can calculate the model input uM(i) using Formula (27) shown below. In this case, by changing the minimization problem of Formula (22) to a minimization problem of Formula (28) shown below, a gain map and an offset map describing determination conditions of the model gain Ki, the model offset Gi, the target value model gain Kri, the target value speed model gain Kvri, and the target value acceleration model gain Kari of Formula (27) are obtained. That is, by generating a gain map and an offset map to minimize an evaluation function explained below, it is possible to automatically obtain an appropriate gain map and an appropriate offset map.

$$uM(i) = Ki\, xM(i) + Gi + Kri\, r(i) + Kvri\, vr(i) + Kari\, ar(i) \quad (27)$$

$$\min_{uM(i),\ldots,uM(i+N-1)} \sum_{l=0}^{N-1} \left( \left\| \begin{bmatrix} Q & 0 \\ 0 & 0 \end{bmatrix} \begin{bmatrix} xM(i+1) \\ \tilde{r}(i+1) \\ \tilde{vr}(i+1) \\ \tilde{ar}(i+1) \end{bmatrix} \right\|_d + \|R\, uM(i+l)\|_d \right) + \left\| \begin{bmatrix} PN & 0 \\ 0 & 0 \end{bmatrix} \begin{bmatrix} xM(i+N) \\ \tilde{r}(i+N) \\ \tilde{vr}(i+N) \\ \tilde{ar}(i+N) \end{bmatrix} \right\|_d \quad (28)$$

subject to $|uM(i+1)| \leq uMmax$ $$\begin{bmatrix} xM(i+1) \\ \tilde{r}(i+1) \\ \tilde{vr}(i+1) \\ \tilde{ar}(i+1) \end{bmatrix} = \begin{bmatrix} A & 0 & 0 & 0 \\ 0 & I & Ts & 0 \\ 0 & 0 & I & Ts \\ 0 & 0 & 0 & I \end{bmatrix} \begin{bmatrix} xM(i) \\ r(i) \\ vr(i) \\ ar(i) \end{bmatrix} + \begin{bmatrix} B \\ 0 \\ 0 \\ 0 \end{bmatrix} uM(i) \; \forall l \in [0 \; N-1]$$

As explained above, in the first embodiment, by configuring the motor control apparatus 100 as explained above, it is possible to automatically determine characteristics of the controller with respect to a variously changing target value with small computational complexity and without making a control input to the controlled object 4 such as torque of the motor discontinuous. Consequently, it is possible to cause a control output to follow the target value at high speed and high accuracy while limiting an absolute value and a change amount of the control input to the controlled object 4.

Second Embodiment

A motor control apparatus 200 according to a second embodiment of the present invention is explained with reference to FIG. 4 to FIG. 6. Note that, in an explanation in this embodiment, as in the first embodiment, for simplification of the explanation, the model input uM(i−1) at the immediately preceding step is used as the past model input uM'(i). The target value memories 151 are provided by a number (i.e., M=2) for enabling storage and retention of a target value between two steps. However, this is not limited to the fact that the model input at the at the immediately preceding step is used as the past model input and the target value memories 151 are provided by the number for enabling storage and retention of a target value only between two steps.

Figure 4:
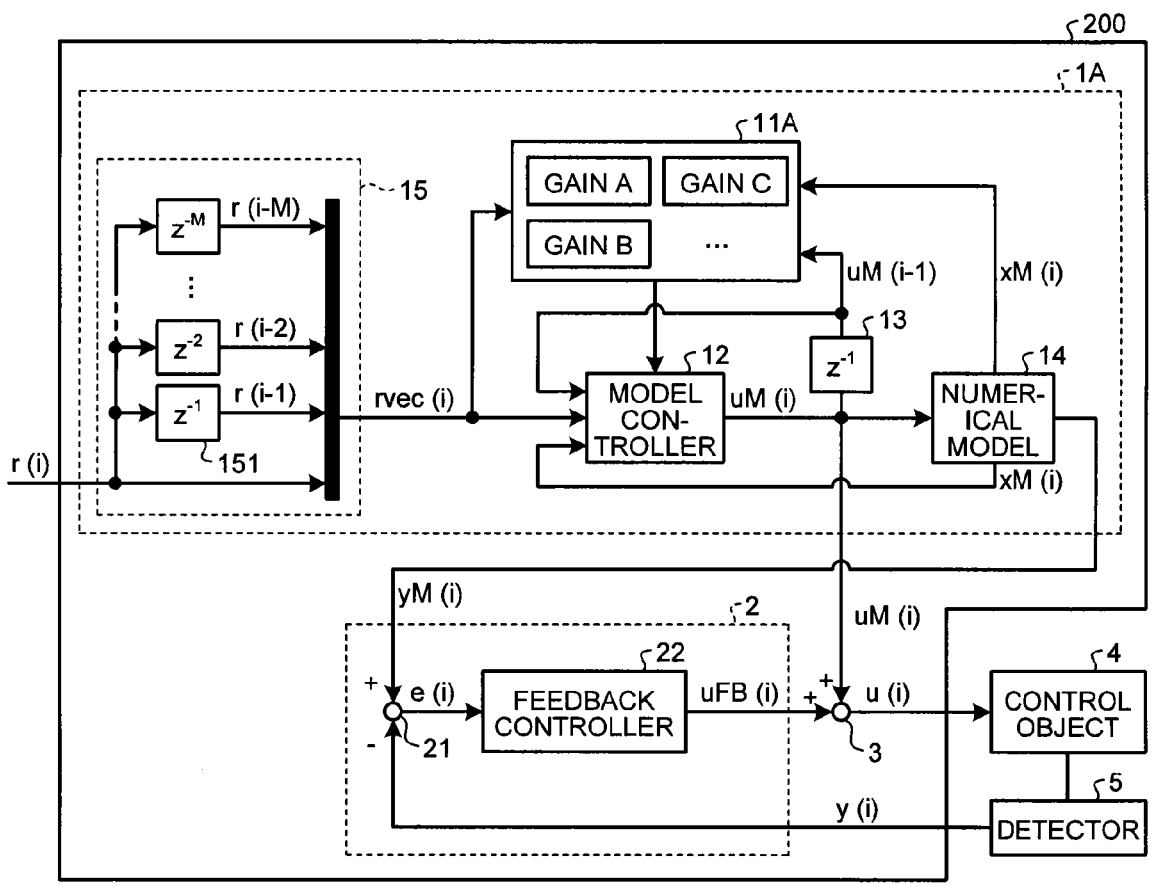
FIG. 4 is a block diagram of the configuration of a motor control apparatus according to a second embodiment of the present invention.

As shown in FIG. 4, the target value r(i) with respect to the control output y(i) representing the position and the speed of a machine to be driven and the control output y(i) of the controlled object 4 representing the position and the speed of a motor detected by the detector 5 are input to the motor control apparatus 200 according to this embodiment. The motor control apparatus 200 outputs the control input u(i) such as torque or an electric current of the motor to the controlled object 4.

As shown in FIG. 4, the motor control apparatus 200 according to this embodiment is configured by a reference model unit 1A, the feedback control unit 2, and the model input adder 3. The motor control apparatus 200 is connected to the controlled object 4 including a machine load and a motor such as a rotary motor or a linear motor for driving the machine load and the detector 5 such as an encoder. The feedback control unit 2, the model input adder 3, the controlled object 4, and the detector 5 have configurations same as the configurations in the first embodiment. Therefore, explanation of the configurations is omitted.

The target value r(i) is input to the reference model unit 1A. The reference model unit 1A outputs the model output yM(i) indicating an ideal operation waveform of the controlled object 4 to the feedback control unit 2. Further, the reference model unit 1A outputs the model input uM(i) for driving the controlled object 4 to the model input adder 3 such that the control output y(i) output from the detector 5 follows the target value r(i).

The reference model unit 1A includes the target-value storing unit 15 configured to store and retain the target value r(i) for a predetermined time and output the stored and retained one or a plurality of past target values as the target value vector rvec(i) together with the input present target value r(i), a model-controller determining unit 11A configured to determine a model controller out of a predetermined plurality of candidates, the model controller 12 configured to cause the model output yM(i) to follow the target value r(i), the model input memory 13 configured to store the model input uM(i), and the numerical model 14 simulating characteristics of the controlled object 4. The operations of the model controller 12, the model input memory 13, the numerical model 14, and the target-value storing unit 15 are the same as the operations in the first embodiment. Therefore, explanation of the operations is omitted.

In the motor control apparatus 200 according to this embodiment, the operation of the model-controller determining unit 11A is different from the operation of the model-controller determining unit 11 of the motor control apparatus 100 according to the first embodiment. That is, in this embodiment, the model-controller determining unit 11A determines a plurality of candidates designed in advance according to pole arrangement or the like.

In this embodiment, the model-controller determining unit 11A receives the target value vector rvec(i), the model input uM(i−1) at the immediately preceding step, and the state variable xM(i) of the numerical model 14, determines one set out of a plurality of the model gain Ki, target value model gain Kri, the target value speed model gain Kvri, and target value acceleration model gain Kari designed in advance such that values of the model input uM(i) and the model input change amount ΔuM(i) do not exceed the predetermined values, and outputs the gains to the model controller 12. Note that, in this embodiment, it is assumed that the model-controller determining unit 11A always determines the model offset Gi as 0. By setting a plurality of candidates of the model gain Ki, the target value model gain Kri, the target value speed model gain Kvri, and the target value acceleration model gain Kari in advance, it is possible to reduce online computational complexity and set a sampling time to be earlier. Note that, in this embodiment, as in the first embodiment, when the model input change amount ΔuM(i) is generated from a deviation between the target value r(i) and the state variable xM(i) caused to follow the target value r(i), the target value model gain Kri is automatically determined from the model gain Ki.

A determination method of the model gain Ki, the target value speed model gain Kvri, and the target value acceleration model gain Kari by the model-controller determining unit 11A is explained next. For the determination of the model gain Kr, the target value speed model gain Kvri, and the target value acceleration model gain Kari, a maximum output admissible set O∞i is used. The maximum output admissible set O∞i is a set of conditions under which a control system (a closed loop system) does not violate a control constraint, and a calculation method for the maximum output admissible set O∞i is described in 'Hirata, Fujita, "Analysis of constraints for a linear discrete time system including an external input", Institute of Electrical Engineers of Japan C, 118-3, 384/390-, 1998'. In this embodiment, as in the first embodiment, as the constraint, a constraint under which the model input uM(i) and the model input change amount ΔuM(i) described in Formula (20) do not exceed the predetermined values is examined. First, the maximum output admissible set O∞i is explained.

In this embodiment, as in the first embodiment, the motor control apparatus 200 includes the target-value storing unit 15. As shown in FIG. 3, the model controller 12 included in the reference model unit 1A feeds back the model input uM(i) at the immediately preceding step to the model sub-controller 121, adds up, with the model input change amount adder 122, the model input change amount ΔuM(i) and the model input uM(i−1) at the immediately preceding step, and generates the model input uM(i). Therefore, the discrete time state equation represented by Formula (19) obtained by combining the target-value storing unit 15, the model input memory 13, the numerical model 14, and the model input change amount adder 122 is examined.

Ones of the candidates of the model gain Ki, the target value model gain Kri, the target value speed model gain Kvri, and the target value acceleration model gain Kari set in advance are respectively represented by K1, Kr1, Kvr1, and Kar1. In the following examination, the model sub-controller 121 calculates, using these gains, the model input change amount ΔuM(i) as indicated by Formula (29) below from the state variable xM(i) of the numerical model 14, the model input uM(i−1) at the immediately preceding step, the target value r(i), the target value speed vr(i), and the target value acceleration ar(i) using Formula (27).

$$\Delta uM(i) = K1 \begin{bmatrix} xM(i) \\ uM(i-1) \end{bmatrix} + Kr1 \; r(i) + Kvr1 \; vr(i) + Kar1 \; ar(i) \quad (29)$$

In this embodiment, the model-controller determining unit 11A always determines the model offset Gi as 0. Therefore, a term of the model offset Gi has been excluded in Formula (29).

Further, Formula (30) shown below is obtained by substituting Formula (29) in Formula (19).

$$\begin{bmatrix} xM(i+1) \\ uM(i) \\ \tilde{r}(i+1) \\ \tilde{v}r(i+1) \\ \tilde{a}r(i+1) \end{bmatrix} = \begin{bmatrix} A & B & 0 & 0 & 0 \\ 0 & I & 0 & 0 & 0 \\ 0 & 0 & I & Ts & 0 \\ 0 & 0 & 0 & I & Ts \\ 0 & 0 & 0 & 0 & I \end{bmatrix}$$

$$+ \begin{bmatrix} B \\ I \\ 0 \\ 0 \\ 0 \end{bmatrix} [K1 \quad Kr1 \quad Kvr1 \quad Kar1] \begin{bmatrix} xM(i) \\ uM(i-1) \\ r(i) \\ vr(i) \\ ar(i) \end{bmatrix}$$

$$yM(i) = ([C \quad D \quad 0 \quad 0 \quad 0] + D[K1 \quad Kr1 \quad Kvr1 \quad Kar1]) \begin{bmatrix} xM(i) \\ uM(i-1) \\ r(i) \\ vr(i) \\ ar(i) \end{bmatrix}$$

(30)

Formula (30) represents a closed loop system of the reference model unit 1A. If the state variable xM(i) of the numerical model 14 at an ith step is determined, assuming that target value prediction values r̃(i+1), r̃(i+2), ... and target values r(i+1), r(i+2), ..., target value speed prediction values ṽr(i+1), ṽr(i+2), ... and target value speeds vr(i+1), vr(i+2), ..., target value acceleration prediction values ãr(i+1), ãr(i+2), ... and target value accelerations ar(i+1), ar(i+2), ... after the i step time are respectively equal, that is, Formula (31) shown below holds.

$$\tilde{r}(i+1)=r(i+1), l>0, \tilde{v}r(i+1)=vr(i+1), l>0, \tilde{a}r(i+1)=ar(i+1), l>0 \quad (31)$$

by repeatedly calculating Formula (30), a state variable xM(i+1) (1>0) of the numerical model 14, a model input uM(i+1) (1>0), a target value r(i+1) (1>0), target value speed vr(i+1) (1>0), and target value acceleration ar(i+1) (1>0) after the ith step can be calculated. Because the state variable xM(i) of the numerical model 14, the model input uM(i), the target value r(i), the target value speed vr(i), and the target value acceleration ar(i) at respective steps can be calculated, by using Formula (29), the model input change amount ΔuM (i+1), 1>0 at the respective steps can also be calculated. Therefore, if a model gain K1, a target value speed model gain Kvr1, and a target value acceleration model gain Kar1 and the state variable xM(i) of the numerical model 14, the model input uM(i−1) at the immediately preceding step, the target value r(i), the target value speed vr(i), and the target value acceleration ar(i) are determined, it is possible to calculate beforehand whether or not the control constraint of Formula (20) is satisfied.

Therefore, conversely, when the control constraint of Formula (20), the model gain K1, the target value speed model gain Kvr1, and the target value acceleration model gain Kar1 are given, the state variable xM(i) of the numerical model 14, the model input uM(i), the target value r(i), the target value speed vr(i), and the target value acceleration ar(i), which do not violate the control constraint, can also be calculated. As explained above, the condition not violating the control constraint is referred to as maximum output admissible set O∞i.

Figure 5:
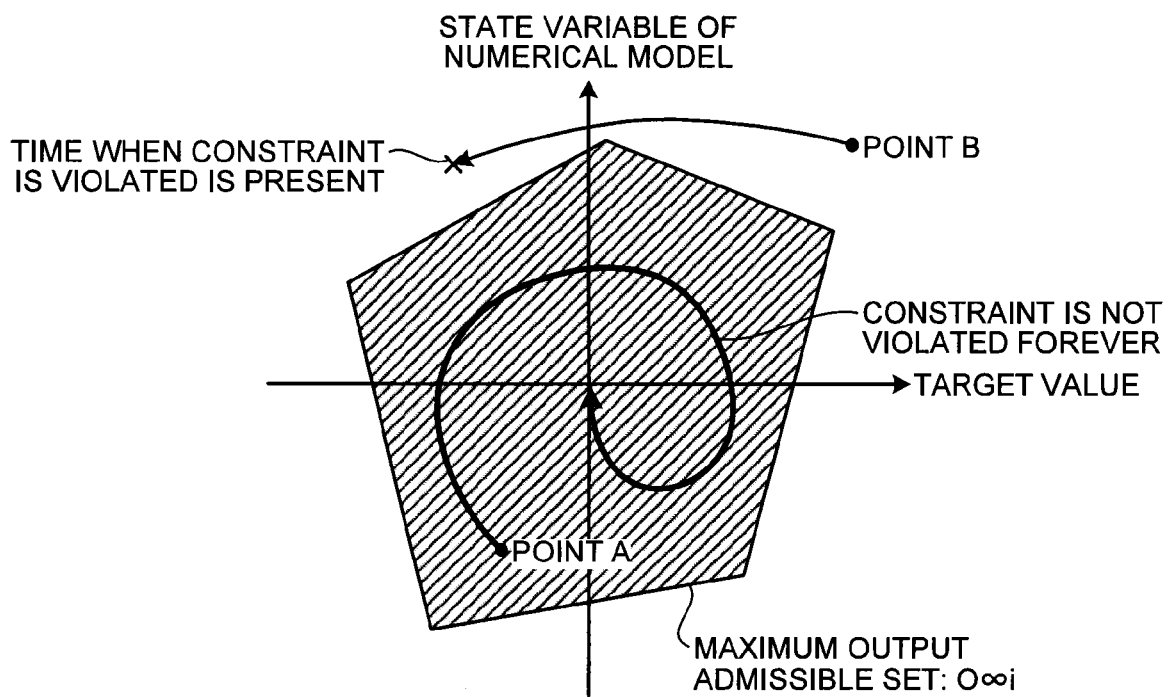
FIG. 5 is a diagram of an example of a maximum output admissible set of the motor control apparatus according to the second embodiment of the present invention.

FIG. 5 is a diagram of an example of the maximum output admissible set $O\infty i$ of the motor control apparatus 200 according to the second embodiment of the present invention.

In FIG. 5, the ordinate represents the state variable xM(i) of the numerical model 14 and the abscissa represents the target value r(i). The inside of a polygon represents the maximum output admissible set $O\infty i$. Actually, because the target value speed vr(i) and the target value acceleration ar(i) are also elements configuring the maximum output admissible set $O\infty i$, the target value speed vr(i) and the target value acceleration ar(i) should be added to the axes of FIG. 5. However, in FIG. 5, to simplify the explanation, the target value speed vr(i) and the target value acceleration ar(i) are omitted. A point A represents a state in which the state variable xM(i) and the target value r(i) at the ith step of the numerical model 14 is present on the inside of the maximum output admissible set $O\infty i$. A point B represents a state in which the state variable xM(i) and the target value r(i) at the ith step are present on the outside of the maximum output admissible set $O\infty i$. When the state variable xM(i) at the i step is present on the inside of the maximum output admissible set $O\infty i$ as indicated by the point A, the control constraint of Formula (20) is not violated after the ith step. However, when the state variable xM(i) at the ith step is present on the outside of the maximum output admissible set $O\infty i$ as indicated by the point B, even if the control constraint of Formula (20) is satisfied at the ith step, the control constraint of Formula (20) is necessarily violated at some time point after the ith step time.

A determination method for the model gain Ki, the target value speed model gain Kvri, and the target value acceleration model gain Kari using the maximum output admissible set $O\infty i$ by the model-controller determining unit 11A is explained. In the following explanation with reference to FIG. 6, there are three sets of model gains, target value model gains, target value speed model gains, and target value acceleration model gains. FIG. 6 is a diagram of an operation example of the motor control apparatus 200 according to the second embodiment of the present invention. It goes without saying that model gains, target value model gains, target value speed model gains, and target value acceleration model gains are not limited to, for example, the three sets of model gains, target value model gains, target value speed model gains, and target value acceleration model gains by this embodiment.

Figure 6:
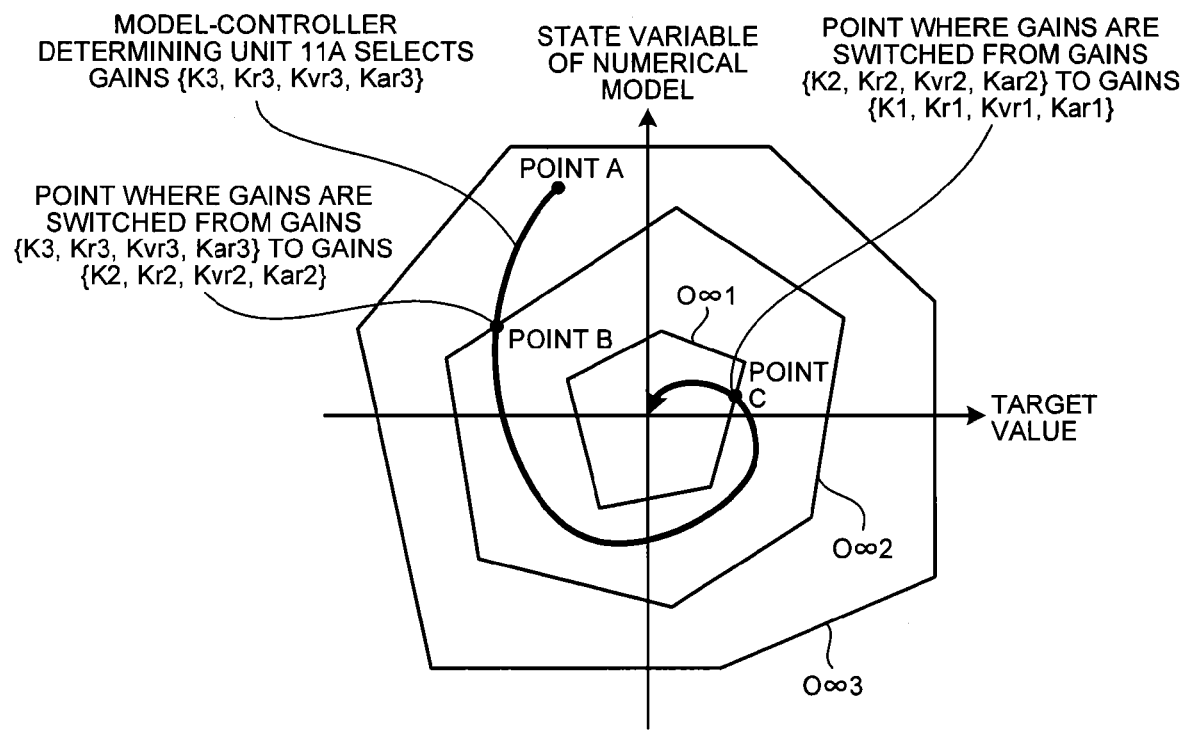
FIG. 6 is a diagram of an operation example of the motor control apparatus according to the second embodiment of the present invention.

FIG. 6 represents a state in which three sets of model gains, target value model gains, target value speed model gains, and target value acceleration model gains {K, Kr1, Kvr1, Kar1}, {K2, Kr2, Kvr2, Kar2}, and {K3, Kr3, Kvr3, Kar3} are designed in advance and maximum output admissible sets $O\infty 1$, $O\infty 2$, and $O\infty 3$ obtained when the respective sets of gains are used are calculated. In FIG. 6, the ordinate represents the state variable xM(i) of the numerical model 14 and the ordinate represents the target value r(i). In this embodiment, gains with which the control output y(i) follows the target value r(i) fastest are {K1, Kr1, Kvr1, Kar1} and gains with which the control output Y(i) follows the target value r(i) slowest are {K3, Kr3, Kvr3, Kar3}. The gains {K2, Kr2, Kvr2, Kar2} are gains with which the control output y(i) follows the target value r(i) slower than the gains {K1, Kr1, Kvr1, Kar1} and faster than {K3, Kr3, Kvr3, Kar3}. The largest output admissible set $O\infty i$ depends on gains {Ki, Kr1, Kvri, Kvri kari}. Therefore, the maximum output admissible sets $O\infty 1$, $O\infty 2$, and $O\infty 3$ obtained when the respective gains are used are as shown in FIG. 6.

For example, it is assumed that the state variable xM(i) and the target value r(i) of the numerical model 14 are present at the point A. The point A is present on the inside of the maximum output admissible set $O\infty 3$ and on the outside of the maximum output admissible sets $O\infty 1$ and $O\infty 2$. Therefore, when the gains {K3, Kr3, Kvr3, Kar3} are used, the control constraint of Formula (20) is not violated. However, when the gains {K2, Kr2, Kvr2, Kar2} and {K1, Kr1, Kvr1, Kar1} are used, the constraint of Formula (20) is violated soon. Therefore, the model-controller determining unit 11A determines the gains {K3, Kr3, Kvr3, Kar3} not violating the constraint of Formula (20) and outputs the selected gains to the model controller 12.

Subsequently, it is assumed that the state variable xM(i) of the numerical model 14 and the target value r(i) transition to the point B. The point B is present on the inside of the maximum output admissible sets $O\infty 3$ and $O\infty 2$ and on the outside of the maximum output admissible set $O\infty 1$. Therefore, when the gains {K2, Kr2, Kvr2, Kar2} and {K3, Kr3, Kvr3, Kar3} are used, the control constraint of Formula (20) is not violated. When the gains {K1, Kr1, Kvr1, Kar1} are used, the control constraint of Formula (20) is violated soon. In this way, when a plurality of gains not violating the control constraint of Formula (20) are present, the model-controller determining unit 11A determines gains with which the control output y(i) follows the target value r(i) fastest. That is, in this case, because the control output y(i) follows the target value r(i) faster with the gains {K2, Kr2, Kvr2, Kar2} than the gains {K3, Kr3, Kvr3, Kar3}, the model-controller determining unit 11A determines the gains {K2, Kr2, Kvr2, Kar2} and outputs the gains to the model controller 12.

Thereafter, it is assumed that the state variable xM(i) of the numerical model 14 and the target value r(i) transition to the point C. The point C is present on the inside of the maximum output admissible sets $O\infty 1$, $O\infty 2$, and $O\infty 3$. Therefore, irrespective of which of the gains {K1, Kr1, Kvr1, Kar1}, {K2, Kr2, Kvr2, Kar2}, and {K3, Kr3, Kvr3, Kar3} are used, the control constraint of Formula (20) is not violated. Therefore, the model-controller determining unit 11A determines the gains {K1, Kr1, Kvr1, Kar1} with which the control output y(i) follows the target value r(i) fastest among the gains and outputs the gains {K1, Kr1, Kvr1, Kar1} to the model controller 12.

When the above operations are summarized, the model-controller determining unit 11A performs three operations explained below.

1. The model-controller determining unit 11A calculates the maximum output admissible set $O\infty i$ (i=1, and Z) for the model gain Ki, the target value model gain Kri, the target value speed model gain Kvri, and the target value acceleration model gain Kari (i=1, ..., and Z) designed in advance. Z is a number of designed gains.

2. The model-controller determining unit 11A acquires the target value vector rvec(i), the state variable xM(i) of the numerical model 14, and the model input uM(i−1) at the immediately preceding step and determines whether the present value is present on the inside or the outside of the maximum output admissible set $O\infty i$ created using the gains {Ki, Kri, Kvri, Kari}. That is, the model-controller determining unit 11A determines whether the control constraint is not violated when the gains {Ki, Kri, Kvri, Kari} are used.

3. The model-controller determining unit 11A determines the gains {Ki, Kri, Kvri, Kari} not violating the control constraint and outputs the gains to the model controller 12. If there are a plurality of gains {Ki, Kri, Kvri, Kari} not violating the control constraint, the model-controller determining unit 11A determines the gains with which the control output y(i) follows the target value r(i) fastest among the gains.

The model sub-controller 121 calculates the model input change amount $\Delta uM(i)$ according to Formula (14) using the model gain Ki, the target value model gain Kri, the target value speed model gain Kvri, and the target value acceleration model gain Kari output from the model-controller determining unit 11A and outputs the model input change amount ΔuM(i) to the model input change amount adder 122. As explained above, in this embodiment, the model offset Gi is assumed to be 0 in Formula (14). The model input change amount adder 122 adds up the model input uM(i−1) at the immediately preceding step and the model input change amount ΔuM(i) using Formula (17) and outputs a sum of the model input uM(i−1) and the model input change amount ΔuM(i) to the model input memory 13, the numerical model 14, and to the model input adder 3. The numerical model 14 calculates the model output yM(i) and the state variable xM(i+1) at the next step by applying Formula (2) to the state variable xM(i) and the model input uM(i) and outputs the state variable xM(i+1) at the next step to the model-controller determining unit 11A and the model controller 12, and outputs the model output yM(i) to the feedback control unit 2. The model input memory 13 stores the model input uM(i) during one step.

By repeatedly performing the operations explained above, the reference model unit 1A generates the model output yM(i) and the model input uM(i).

Effects obtained by the second embodiment are explained below.

With the motor control apparatus 200 according to this embodiment, as in the first embodiment, the model input uM(i) is generated using the model input M(i−1) at the immediately preceding step. Therefore, the model input change amount ΔuM(i) can be set as a new input. As a result, it is possible to easily realize a motor control apparatus in which not only the model input uM(i) but also the model input change amount ΔuM(i) is not larger than a certain predetermined value. That is, it is possible to obtain a high-speed and high-accuracy motor control apparatus while preventing torque saturation, torque change rate saturation, and voltage saturation closely related to the torque change rate saturation. Even if the model gain, the target value model gain, the target value speed model gain, and the target value acceleration model gain are switched, it is possible to prevent the model input uM(i) from suddenly changing. That is, by performing determination of a model controller such that a model input is smaller than a predetermined value, it is possible to prevent occurrence of torque saturation. By performing determination of the model controller such that a change amount of the model input is smaller than a predetermined value, it is possible to prevent occurrence of voltage saturation and reduce a shock that occurs when the model controller is switched.

In this embodiment, as in the first embodiment, the calculation of the model input uM(i) is only determination of the model gain Ki, the target value model gain Kri, the target value speed model gain Kvri, and the target value acceleration model gain Kari, and multiplication of the state variable xM(i) of the numerical model 14, the target value r(i), the target value speed vr(i), and the target value acceleration ar(i) with the gains. Therefore, because the calculation time can be reduced, it is possible to reduce the sampling time as well.

The target-value storing unit 15 stores the past target values r(i−1), r(i−2), . . . . Consequently, it is possible to also take into account the target value speed vr(i) and the target value acceleration ar(i) during the calculation of the model input change amount ΔuM(i). It is possible to design a control system in which the control output y(i) follows the target value r(i) faster than when these values are not used.

In this embodiment as well, as in the first embodiment, the model input at the immediately preceding step is used as the past model input. However, the past model input is not always limited to the model input at the immediately preceding step. For example, it is easy to give the same effects using, for example, a model input before a plurality of steps. Effects same as the effects of this embodiment can be obtained when a past model input other than the model input at the immediately preceding step is used as the past model input.

Third Embodiment

A motor control apparatus 300 according to a third embodiment of the present invention is explained with reference to FIG. 7 to FIG. 10. Note that, in an explanation in this embodiment, as in the first and second embodiments, the model input uM(i−1) at the immediately preceding step is used as the past model input uM'(i). The target value memories 151 are provided by a number (i.e., M=2) for enabling storage and retention of a target value between two steps. However, this is just an example, and is not limited to the fact that the model input at the at the immediately preceding step is used as the past model input and the target value memories 151 are provided by the number for enabling storage and retention of a target value only between two steps.

In this embodiment, as in the second embodiment, determination of a model controller is performed using the maximum output admissible set O∞i. However, this embodiment is different from the second embodiment in that, whereas the model gain Ki, the target value model gain Kri, the target value speed model gain Kvri, and the target value acceleration model gain Kari are switched in the second embodiment, the structure itself of the controller is switched in this embodiment.

The motor control apparatus 300 according to this embodiment receives the target value r(i) and the control output y(i) with respect to the control output y(i) detected by the detector 5 representing the position and the speed of a machine to be driven or the position and the speed of the motor and outputs the control input u(i) such as torque and an electric current of the motor to the control apparatus 4 such that the control output y(i) follows the target value r(i).

Figure 7:
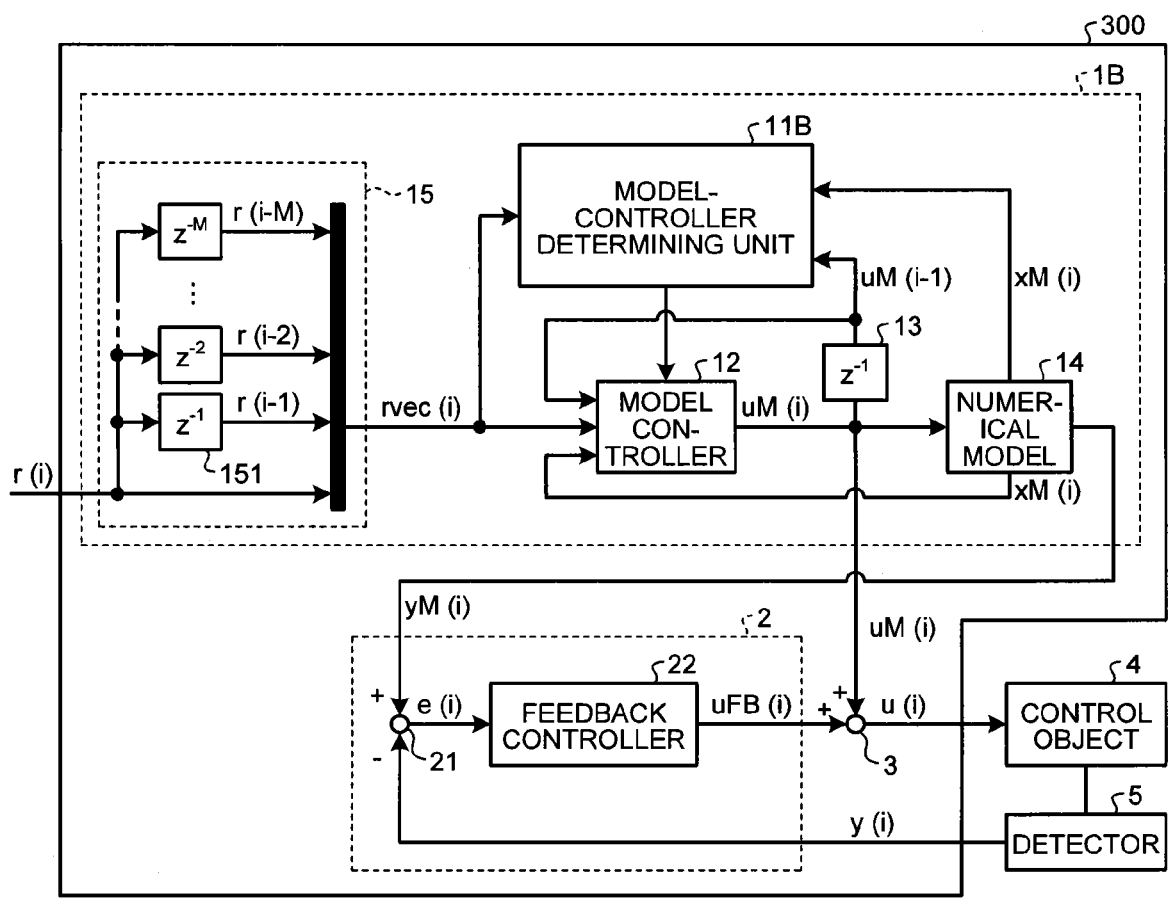
FIG. 7 is a block diagram of the configuration of a motor control apparatus according to a third embodiment of the present invention.

As shown in FIG. 7, the motor control apparatus 300 according to this embodiment is configured by a reference model unit 1B, the feedback control unit 2, and the model input adder 3. The motor control apparatus 300 is connected to the controlled object 4 including a machine load and a motor such as a rotary motor or a linear motor for driving the machine load and the detector 5 such as an encoder. The target-value storing unit 15, the feedback control unit 2, the model input adder 3, the controlled object 4, and the detector 5 have configurations same as the configurations in the first and second embodiments. Therefore, explanation of the configurations is omitted.

The target value r(i) is input to the reference model unit 1B. The reference model unit 1B outputs the model output yM(i) indicating an ideal operation of the controlled object 4 to the feedback control unit 2. Further, the reference model unit 1B outputs the model input uM(i) for driving the controlled object 4 to the model input adder 3 such that the control output y(i) output from the detector 5 follows the target value r(i).

The reference model unit 1B includes the target-value storing unit 15 configured to store and retain the target value r(i) for a predetermined time and output stored and retained one or a plurality of past target values as the target value vector rvec(i) together with the input present target value r(i), a model-controller determining unit 11B configured to determine the model controller 12 out of a predetermined plurality of candidates, the model controller 12 configured to cause the model output yM(i) to follow the target value r(i) included in the target value vector rvec(i), the model input memory 13 configured to store the model input uM(i), and the numerical model 14 simulating characteristics of the controlled object 4. The operations of the model controller 12, the model input memory 13, the numerical model 14, and the target-value storing unit 15 are the same as the operations in the first and second embodiments. Therefore, explanation of the operations is omitted.

A difference between this embodiment and the motor control apparatuses 100 and 200 in the first and second embodiments is the operation of the model-controller determining unit 11B. In this embodiment, a method of determining, with the model-controller determining unit 11B, a plurality of candidates designed in advance according to pole arrangement or the like is explained.

Figure 8:
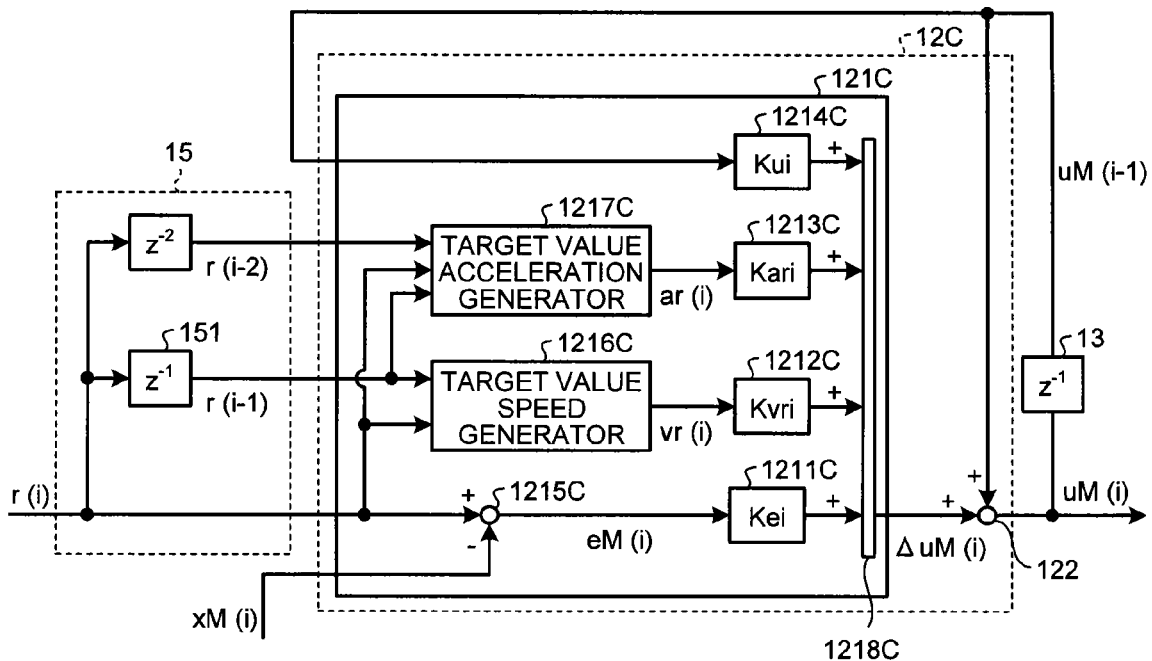
FIG. 8 is a block diagram of an example of a candidate of a model controller of the motor control apparatus according to the third embodiment of the present invention.
Figure 9:
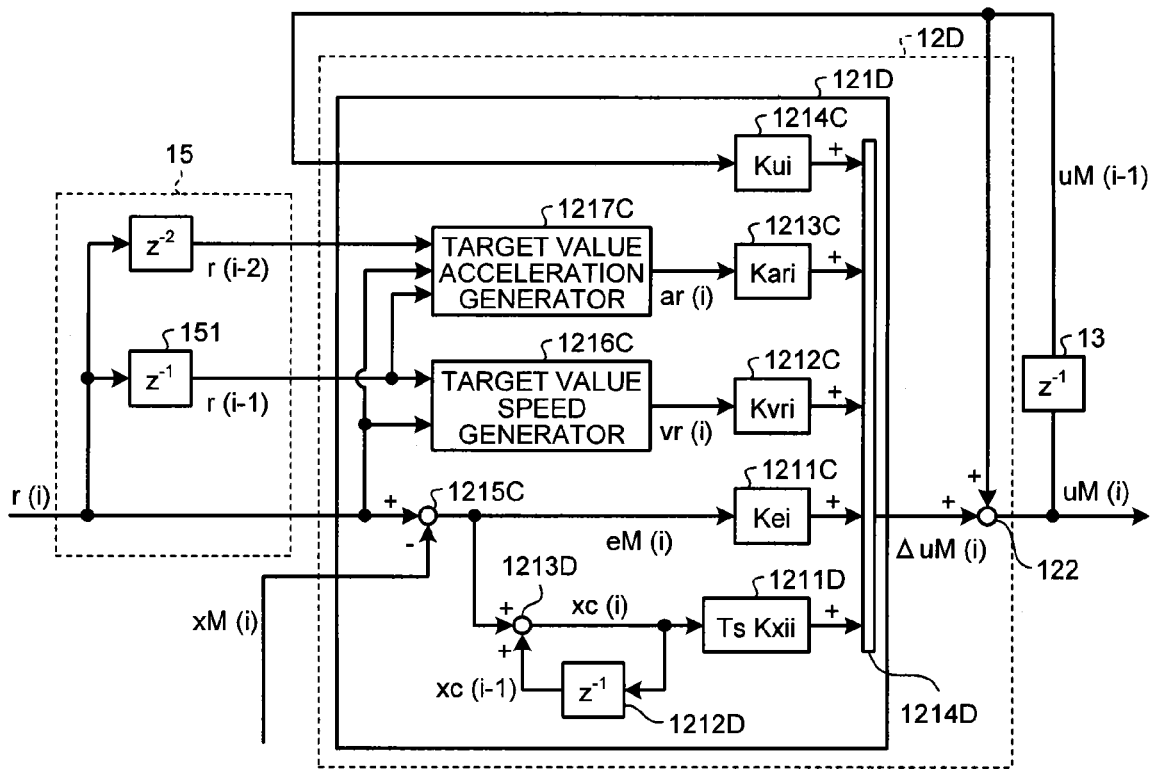
FIG. 9 is a block diagram of an example of a candidate of the model controller of the motor control apparatus according to the third embodiment of the present invention.
Figure 10:
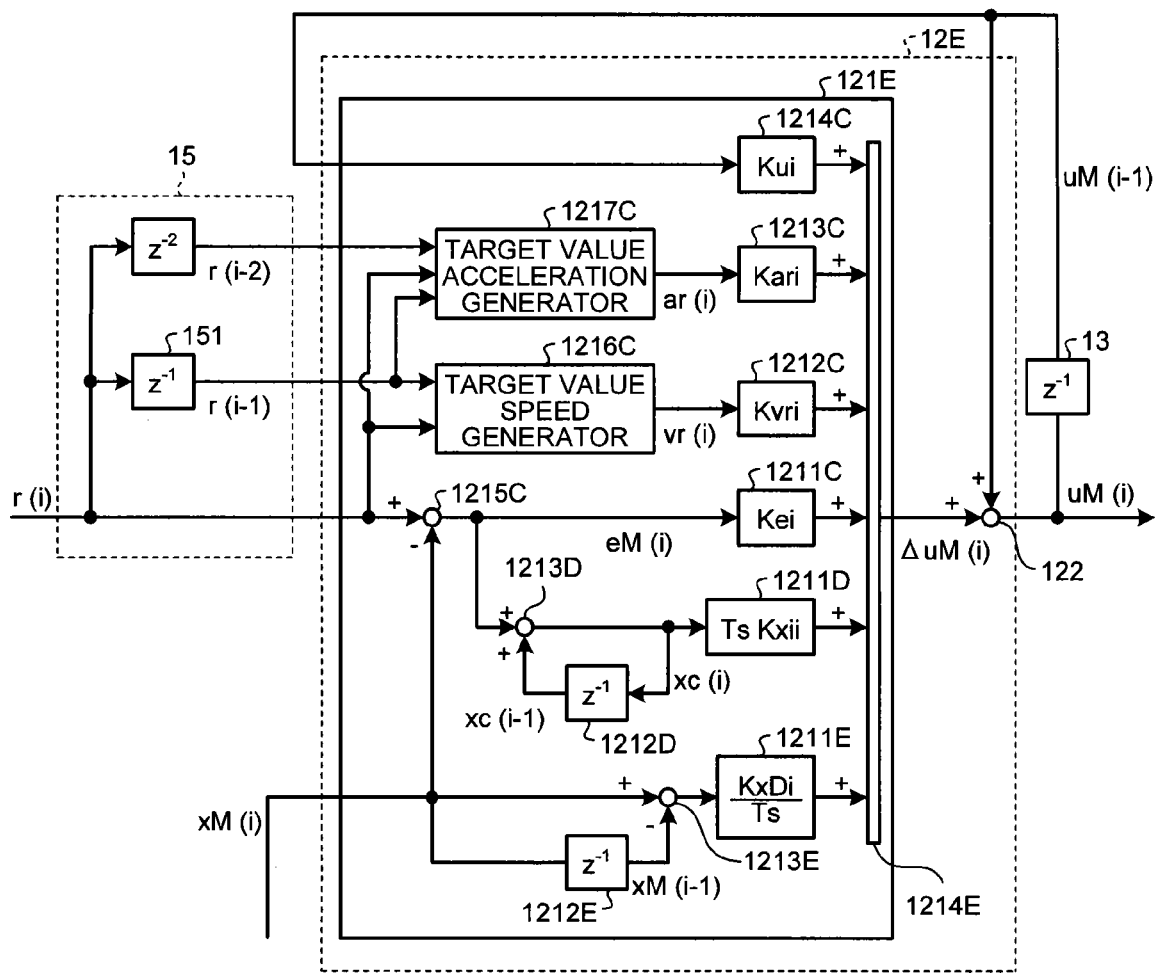
FIG. 10 is a block diagram of an example of a candidate of the model controller of the motor control apparatus according to the third embodiment of the present invention.

In the following explanation, in this embodiment, to simplify the explanation, the discrete time state equation represented by Formula (19) obtained by combining the target-value storing unit 15, the numerical model 14, the model input change amount adder 122, and the model input memory 13 is examined. In the explanation, three model sub-controllers 121C, 121D, and 121E shown in FIG. 8 to FIG. 10 are designed in advance. However, model sub-controllers are not limited to use of the model sub-controllers 121C, 121D, and 121E by this embodiment.

The model sub-controller 121C shown in FIG. 8 receives the target value r(i), the target value r(i−1) at the immediately preceding step, the target value r(i−2) at the second immediately preceding step, the state variable xM(i) of the numerical model 14, and the model input uM(i−1) at the immediately preceding step and outputs the model input change amount ΔuM(i) to the model input change amount adder 122.

The model sub-controller 121C includes a model subtracter 1215C configured to receive the target value r(i) and the state variable xM(i) and output a model deviation eM(i), which is a difference between the target value r(i) and the state variable xM(i), a model-deviation-gain multiplier 1211C configured to calculate a product of the model deviation eM(i) output from the model subtracter 1215C and a model deviation gain Kei and output the product to an adder 1218C, a target value speed generator 1216C configured to receive the target value r(i) and the target value r(i−1) at the immediately preceding step, calculate the target value speed r(i) using Formula (15), and output the target value speed vr(i) to a target value speed model gain multiplier 1212C, and the target value speed model gain multiplier 1211C configured to receive the target value speed vr(i) output from the target value speed generator 1216C, multiply a value of the target value speed vr(i) with a target value speed model gain Kvri, and output the product to the adder 1218C.

Further, the model sub-controller 121C includes a target value acceleration generator 1217C configured to receive the target value r(i), the target value r(i−1) at the immediately preceding step, and the target value r(i−2) at the second immediately preceding step, calculate the target value acceleration ar(i) using Formula (16), and output the target value acceleration ar(i) to a target value acceleration model gain multiplier 1213C, the target value acceleration model gain multiplier 1213C configured to receive the target value acceleration ar(i) output from the target value acceleration generator 1217C, multiply a value of the target value acceleration ar(i) and the target value acceleration model gain Kari, and output a product of the value and the target value acceleration model gain Kari to the adder 1218C, and an immediately preceding step model input gain multiplier 1214C configured to receive the model input uM(i−1) at the immediately preceding step, calculate a product of a value of the model input uM(i−1) and a model input gain Kui at the immediately preceding step, and output a calculation result to the adder 1218C.

The model sub-controller 121C includes the adder 1218C configured to add up all of the output of the model deviation gain multiplier 1211C, the output of the target value speed model gain multiplier 1212C, the output of the target value acceleration model gain multiplier 1213C, and the output of the immediately preceding step model input gain multiplier 1214C and output a sum of the outputs as the model input change amount ΔuM(i).

The model sub-controller 121D shown in FIG. 9 receives the target value r(i), the target value r(i−1) at the immediately preceding step, the target value r(i−2) at the second immediately preceding step, the state variable xM(i) of the numerical model 14, and the model input uM(i−1) at the immediately preceding step and outputs the model input change amount ΔuM(i) to the model input change amount adder 122.

The model sub-controller 121D shown in FIG. 9 and the model sub-controller 121C shown in FIG. 8 are different in that the model sub-controller 121D uses an integrated value memory 1212D to store an integrated value xc(i) and adds the stored integrated value xc(i−1) to the model deviation eM(i) so as to add an integral operation. In the model sub-controller 121D, the model deviation gain multiplier 1211C, the target value speed model gain multiplier 1212C, the target value acceleration model gain multiplier 1213C, the immediately preceding step model input gain multiplier 1214C, the model subtracter 1215C, the target value speed generator 1216C, and the target value acceleration generator 1217C used in the model sub-controller 121C as well are used. Explanation of the foregoing is omitted.

In addition to these components, the model sub-controller 121D is added with an integrated value adder 1213D configured to add up the model deviation eM(i) and the immediately preceding step integrated value xc(i−1) and output a sum of the model deviation eM(i) and the immediately preceding step integrated value xc(i−1) to a model deviation integral gain multiplier 1211D and the integration value memory 1212D as the integrated value xc(i), the integration value memory 1212D configured to receive the integrated value xc(i), store the integrated value xc(i) for one sampling time, and output, after the one sampling time, the stored value to an integrated value adder 1213D as the immediately preceding step integrated value xc(i−1), the model deviation integral gain multiplier 1211D configured to multiply the integrated value xc(i) with a model deviation integral gain Kxii and the sampling time Ts of the model sub-controller 121D and output the product thereof to an adder 1214D, and the adder 1214D configured to add up all of values output from the model deviation gain multiplier 1211C, the target value speed model gain multiplier 1212C, the target value acceleration model gain multiplier 1213C, the immediately preceding step model input gain multiplier 1214C, and the model deviation integral gain multiplier 1211D and output a sum of the values to the model input change amount adder 122 as the model input change amount ΔuM(i).

The model sub-controller 121E shown in FIG. 10 receives the target value r(i), the target value r(i−1) at the immediately preceding step, the target value r(i−2) at the second immediately preceding step, the state variable xM(i) of the numerical model 14, and the model input uM(i−1) at the immediately preceding step and outputs the model input change amount ΔuM(i) to the model input change amount adder 122.

The model sub-controller 121E shown in FIG. 10 is different from the model sub-controller 121C shown in FIG. 8 and the model sub-controller 121D shown in FIG. 9 in that a differential operation is added to the model sub-controller 121E by using a state variable memory 1212E. The model sub-controller 121E includes the model deviation gain subtracter 1211C, the target value speed model gain multiplier 1212C, the target value acceleration model gain multiplier 1213C, the immediately preceding step model input gain multiplier 1214C, the model subtracter 1215C, the target value speed generator 1216C, and the target value acceleration generator 1217C used in the model sub-controller 121C as well. The model sub-controller 121E further includes the model deviation integral gain multiplier 1211D, the integrated value memory 1212D, and the integrated value adder 1213D used in the model sub-controller 121D as well. These components are explained above. Therefore, explanation of the components is omitted.

In addition to these components, the model sub-controller 121E further includes the state variable memory 1212E configured to receive the state variable xM(i), store an input value for one sampling time, and output, after the one sampling time, the stored value to a state variable differential subtracter 1213E as the state variable xM(i−1) at the immediately preceding step, the state variable differential subtracter 1213E configured to receive the state variable xM(i−1) at the immediately preceding step and the state variable xM(i) output from the state variable memory 1212E, subtract an input value from the state variable xM(i), and output a difference between the value and the state variable xM(i) to a state variable differential gain multiplier 1211E, the state variable differential gain multiplier 1211E configured to divide a value output from the state variable differential subtracter 1213E by the one sampling time Ts, multiplies a division result with a state variable differential gain KxDi, and output a result of the calculation to an adder 1214E, and the adder 1214E configured to add up all of values output from the model deviation gain multiplier 1211C, the target value speed model gain multiplier 1212C, the target value acceleration model gain multiplier 1213C, the immediately preceding step model input gain multiplier 1214C, the model deviation integral gain multiplier 1211D, and the state variable differential gain multiplier 1211E and output a sum of the values to the model input change amount adder 122 as the model input change amount ΔuM(i).

In this embodiment, unlike the second embodiment, the integral operation is added to the model sub-controller 121D by using the integrated value memory 1212D and the differential operation is added to the model bus-controller 121E by using the state variable memory 1212E. Not only the gain but also the configuration of the controller is switched. Note that, in this embodiment, to simplify the description, in the model sub-controllers 121C, 121D, and 121E shown in FIG. 8 to FIG. 10, the model deviation gain Kei, the target value speed model gain Kvri, the target value acceleration model gain Kari, and the immediately preceding step model input gain Kui are represented by the same signs. However, these numerical values can be different for each of the model sub-controllers 121C, 121D, and 121E. In the model sub-controllers 121D and 121E, the model deviation integral gain Kxii is represented by the same sign. However, the numerical value can be different in the model sub-controllers 121D and 121E.

The operation of the model-controller determining unit 11B is explained. The model-controller determining unit 11B determines, on the basis of the target value vector rvec(i), the state variable xM(i) of the numerical model 14, and the immediately preceding step model input uM(i−1), one controller candidate out of a plurality of controller candidate designed in advance such that the model input uM(i) and the model input change amount ΔuM(i) do not exceed the predetermined values. By determining the controller candidates in advance, it is possible to reduce online computational complexity and set a sampling time to be earlier.

In this embodiment, as in the second embodiment, the model-controller determining unit 11B performs determination of the model controller 12 using the maximum output admissible set O∞i. To calculate the maximum output admissible set O∞i, it is necessary to calculate the closed loop system of the reference model unit 1B as indicated by Formula (30) in the second embodiment.

First, a closed loop system obtained when a model controller 12C shown in FIG. 8 is used is calculated. The model input change amount ΔuM(i) obtained when the model sub-controller 121C shown in FIG. 8 is used is calculated as indicated by Formula (32) shown below.

$$\Delta uM(i) = [\,-Kei\ \ Kui\ \ Kei\ \ Kvri\ \ Kari\,] \begin{bmatrix} xM(i) \\ uM(i-1) \\ r(i) \\ vr(i) \\ ar(i) \end{bmatrix} \quad (32)$$

Therefore, by substituting Formula (32) in Formula (19), the closed loop system obtained when the model controller 12C is used is represented by Formula (33) shown below.

$$\begin{bmatrix} xM(i+1) \\ uM(i) \\ \tilde{r}(i+1) \\ \tilde{v}r(i+1) \\ \tilde{a}r(i+1) \end{bmatrix} = $$

$$\begin{bmatrix} A-BKei & B+BKui & BKei & BKvri & BKari \\ -Kei & I+Kui & Kei & Kvri & Kari \\ 0 & 0 & I & Ts & 0 \\ 0 & 0 & 0 & I & Ts \\ 0 & 0 & 0 & 0 & I \end{bmatrix} \begin{bmatrix} xM(i) \\ uM(i-1) \\ r(i) \\ vr(i) \\ ar(i) \end{bmatrix} \quad (33)$$

Similarly, closed loop systems obtained when model controllers 12D and 12E shown in FIG. 9 and FIG. 10 are used is calculated. When the model controller 12D shown in FIG. 9 is used, the model input change amount ΔuM(i) output from the model sub-controller 121D is calculated by Formulas (34) and (35) shown below.

$$\Delta uM(i) = [\,-Kei\ \ Kui\ \ Kei\ \ Kvri\ \ Kari\ \ Kxii\,] \begin{bmatrix} xM(i) \\ uM(i-1) \\ r(i) \\ vr(i) \\ ar(i) \\ xc(i) \end{bmatrix} \quad (34)$$

$$xc(i+1) = xc(i) + r(i) - xM(i) \quad (35)$$

Therefore, by substituting Formulas (34) and (35) in Formula (19), the closed loop system obtained when the model controller 12D is used is represented by Formula (36) shown below.

$$\begin{bmatrix} xM(i+1) \\ uM(i) \\ \tilde{r}(i+1) \\ \tilde{v}r(i+1) \\ \tilde{a}r(i+1) \\ xc(i+1) \end{bmatrix} = \quad (36)$$

-continued $$\begin{bmatrix} A-BKei & B+BKui & BKei & BKvri & BKari & BTs \cdot Kxii \\ -Kei & I+Kui & Kei & Kvri & Kari & Ts \cdot Kxii \\ 0 & 0 & I & Ts & 0 & 0 \\ 0 & 0 & 0 & I & Ts & 0 \\ 0 & 0 & 0 & 0 & I & 0 \\ -I & 0 & I & 0 & 0 & I \end{bmatrix}$$

$$\begin{bmatrix} xM(i) \\ uM(i-1) \\ r(i) \\ vr(i) \\ ar(i) \\ xc(i) \end{bmatrix}$$

When the model controller 12E shown in FIG. 10 is used, the model input change amount ΔuM(i) output from the model sub-controller 121E is calculated by Formula (37) shown below.

$$\Delta uM(i) = [-Kei \quad Kui \quad Kei \quad Kvri \quad Kari \quad Kxii] \begin{bmatrix} xM(i) \\ uM(i-1) \\ r(i) \\ vr(i) \\ ar(i) \\ xc(i) \end{bmatrix} + \frac{KxDi}{Ts}(xM(i) - xM(i-1)) \quad (37)$$

Therefore, by substituting Formulas (35) and (37) in Formula (19), the closed loop system obtained when the model controller 12E is used is represented by Formula (38) shown below.

$$\begin{bmatrix} xM(i+1) \\ uM(i) \\ \tilde{r}(i+1) \\ \tilde{v}r(i+1) \\ \tilde{a}r(i+1) \\ xc(i+1) \\ xM(i) \end{bmatrix} = \begin{bmatrix} A-BKei+B\frac{KxDi}{Ts} & B+BKui & BKei & BKvri & BKari & BTs \cdot Kxii & -B\frac{KxDi}{Ts} \\ -Kei+\frac{KxDi}{Ts} & I+Kui & Kei & Kvri & Kari & Ts \cdot Kxii & -\frac{KxDi}{Ts} \\ 0 & 0 & I & Ts & 0 & 0 \\ 0 & 0 & 0 & I & Ts & 0 \\ 0 & 0 & 0 & 0 & I & 0 \\ -I & 0 & I & 0 & 0 & I & 0 \\ I & 0 & 0 & 0 & 0 & 0 \end{bmatrix} \begin{bmatrix} xM(i) \\ uM(i-1) \\ r(i) \\ vr(i) \\ ar(i) \\ xc(i) \\ xM(i-1) \end{bmatrix} \quad (38)$$

Formulas (33), (36), and (38) are respectively formulas having the same form as Formula (30). Therefore, it is possible to calculate the maximum output admissible set O∞i with a method same as the method in the second embodiment. If a controller in which the model-controller determining unit 11B does not violate Formula (20), which is the control constraint, and the control output y(i) follows the target value r(i) fastest is selected using the maximum output admissible set O∞i, a control system is obtained in which the control constraint is not violated and the control output follows the target value fast. A method of determining, using the maximum output admissible set O∞i, the model controller 12 out of a plurality of candidates determined in advance by the model-controller determining unit 11B is the same as the method explained in the second embodiment. Therefore, explanation of the method is omitted.

With the motor control apparatus 300 according to this embodiment, as in the first and second embodiments, the model input uM(i) is generated using the model input M(i−1) at the immediately preceding step. Therefore, the model input change amount ΔuM(i) can be set as a new input. As a result, it is possible to easily realize a control system in which not only the model input uM(i) but also the model input change amount ΔuM(i) does not become larger than a certain predetermined value. That is, it is possible to obtain a high-speed and high-accuracy motor control apparatus while preventing torque saturation, torque change rate saturation, and voltage saturation closely related to the torque change rate saturation. Even if the model-controller determining unit determines a different model controller and calculates the model input uM(i), it is possible to prevent the model input uM(i) from suddenly changing.

In this embodiment as well, the calculation of the model input uM(i) is only determination of the model controller and calculation of the state variable xM(i) of the numerical model 14 and the model controller. Therefore, because the calculation time can be reduced, it is possible to reduce the sampling time as well.

In this embodiment, as in the first and second embodiments, the model input at the immediately preceding step is used as the past model input. However, the past model input is not always limited to the model input at the immediately preceding step. For example, it is easy to give the same results using, for example, a model input before a plurality of steps. Effects same as the effects of this embodiment can be obtained when a past model input other than the model input at the immediately preceding step is used as the past model input.

Further, the present invention is not limited to the embodiment explained above. At an implementation stage, the embodiments can be variously modified without departing from the spirit of the present invention. Inventions at various stages are included in the embodiments. Various inventions can be extracted according to appropriate combinations in a disclosed plurality of constituent elements. For example, even if several constituent elements are deleted from all the constituent elements explained in each of the first to third embodiments, when the problems explained in the summary can be solved and the effects explained in the summary can be obtained, configurations from which the constituent elements have been deleted can be extracted as inventions. Further, the constituent elements explained in the first to third embodiments can be combined as appropriate.

INDUSTRIAL APPLICABILITY

As explained above, the motor control apparatus according to the present invention is useful for control of a controlled object including a motor and, in particular, suitable for a motor control apparatus that drives an industrial machine.

REFERENCE SIGNS LIST 1, 1A, 1B Reference model units
2 Feedback control unit
3 Model input adder
4 Controlled object
5 Detector
11, 11A, 11B Model-controller determining unit
12, 12C, 12D, 12E Model controller
13 Model input memory
14 Numerical model
15 Target-value storing unit
21 Model output subtracter
22 Feedback controller
100, 200, 300 Motor control apparatuses
121, 121C, 121D, 121E Model sub-controllers
122 Model input change amount adder
151 Target value memory
1211C Model deviation gain multiplier
1212C Target value speed model gain multiplier
1213C Target value acceleration model gain multiplier
1214C Immediately preceding step model input gain multiplier
1215C Model subtracter
1216C Target value speed generator
1217C Target value acceleration generator
1218C, 1214D, 1214E Adders
1211D Model deviation integral gain multiplier
1212D Integrated value memory
1213D Integrated value adder
1211E State variable differential gain multiplier
1212E State variable memory
1213E State variable differential subtracter

The invention claimed is:

1. A motor control apparatus comprising:
a reference model unit configured to generate 1) a target value, which a control output of a controlled object including a motor is caused to follow, 2) a model output representing a desired operation of the controlled object, and 3) a model input for driving the controlled object to the desired operation;
a feedback control unit configured to receive the control output and the model output, and to generate a feedback input for causing the control output to follow the model output; and
a model input adder configured to add up the model input and the feedback input and generate a control input to the controlled object, wherein the reference model unit includes:
a target-value storing unit configured to retain both of a present value of the target value and at least one of past values of the target value as a target value vector;
a numerical model configured to simulate the characteristic of the controlled object and generate the model output and a state variable on the basis of the model input;
a model controller configured to generate the model input using the state variable and the target value vector including the target value and the at least one of the past values of the target value;
a model-controller determining unit configured to determine the model controller from a predetermined plurality of candidates of the model controller on the basis of the target value vector, including the present value of the target value and the at least one of past values of the target value, and the state variable such that the determined model controller generates a present target value for the motor to follow which suppresses vibrations,
wherein
the reference model unit further includes a model input memory configured to retain a past model input,
the model controller generates the model input on the basis of the past model input,
the model-controller determining unit determines a model controller on the basis of the past model input, and
the model controller calculates a change amount of the model input on the basis of the target value vector, the state variable, and the past model input, and generates the model input by adding up the past model input and the change amount.

2. The motor control apparatus according to claim 1, wherein
the model-controller determining unit determines a model gain, which is a numerical vector, on the basis of the target value vector, the state variable, and the past model input, and
the model controller multiplies the target value vector, the state variable, and the past model input with the model gain to generate the change amount.

3. The motor control apparatus according to claim 2, wherein
the model controller adds a model offset to the change amount and then adds up the change amount added with the model offset and the past model input to thereby generate the model input, and
the model-controller determining unit determines the model offset on the basis of the target value vector, the state variable, and the past model input.

4. The motor control apparatus according to claim 1, wherein the model-controller determining unit determines the model controller such that one or both of the model input and the change amount are smaller than predetermined values.

5. The motor control apparatus according to claim 2, wherein the model-controller determining unit determines the model gain such that one or both of the model input and the change amount are smaller than predetermined values.

6. The motor control apparatus according to claim 3, wherein the model-controller determining unit determines the model gain and the model offset such that one or both of the model input and the change amount of the model input is smaller than predetermined values.

7. The motor control apparatus according to claim 2, wherein the model-controller determining unit determines the model gain on the basis of the target value vector, the state variable, and the past model input using a gain map including predetermined candidates of the model gain.

8. The motor control apparatus according to claim 3, wherein the model-controller determining unit determines the model gain and the model offset on the basis of the target value vector, the state variable, and the past model input using a gain map including predetermined candidates of the model gain and an offset map including predetermined candidates of the model offset.

9. The motor control apparatus according to claim 8, wherein the model-controller determining unit determines in advance the gain map and the offset map such that an evaluation function shown below is minimized when xM(i) represents the state variable at an ith step, uM(i) represents the model input at the ith step, ΔuM(i) represents the change amount at the ith step, X represents a constraint set of the state variable, U represents a constraint set of the model input, ΔU represents a constraint set of the change amount, Xf represents a terminal constraint set of the state variable, Uf represents a terminal constraint set of the model input, Q represents a state weight, R represents an input weight, PN represents a terminal weight, l represents an integer, and N represents a horizon.

$$\min_{\Delta uM(i),\ldots,\Delta uM(i+N-1)} \sum_{l=0}^{N-1} \left( \left\| Q \begin{bmatrix} xM(i+l) \\ uM(i+l-1) \end{bmatrix} \right\|_d + \| R\Delta uM(i+l) \|_d \right) + PN \left\| \begin{bmatrix} xM(N+i) \\ uM(N+i-1) \end{bmatrix} \right\|_d$$

subject to $xM(i+l) \in X, uM(i+l) \in U,$ $\Delta uM(i+l-1) \in \Delta U, \forall l \in [0 \quad N-1]$ $xM(i+N) \in Xf, uM(i+N) \in Uf.$ 10. The motor control apparatus according to claim 1, wherein the numerical model is obtained by modeling a vibratory machine system.

* * * * *